United States Patent [19]

Clay

[11] Patent Number: 5,465,338

[45] Date of Patent: Nov. 7, 1995

[54] DISK DRIVE SYSTEM INTERFACE ARCHITECTURE EMPLOYING STATE MACHINES

[75] Inventor: Donald W. Clay, Louisville, Colo.

[73] Assignee: Conner Peripherals, Inc., San Jose, Calif.

[21] Appl. No.: 110,883

[22] Filed: Aug. 24, 1993

[51] Int. Cl.⁶ .................................................. G06F 13/00
[52] U.S. Cl. ........................ 395/310; 395/439; 395/894; 395/404
[58] Field of Search .................................... 395/325, 425, 395/500, 275

[56] References Cited

U.S. PATENT DOCUMENTS 5,276,662  1/1994  Shaver, Jr. et al. ........................ 369/32

Primary Examiner—Jack B. Harvey
Assistant Examiner—John Travis
Attorney, Agent, or Firm—Fliesler, Dubb, Meyer & Lovejoy

[57] ABSTRACT

In a disk drive storage system, an interface apparatus for controlling the transfer of sectors of data between a host processor and a buffer within the storage system in response to READ and WRITE command issued by the host processor. The apparatus comprises a Byte Count State Machine for controlling the transfer of a sector of data between the host processor and the buffer, an Update Task File State Machine for counting the sectors transferred by the Byte Count State Machine and generating the sector address of the next sector to be transferred by the Byte Count State Machine, a Read State Machine for controlling the processing of all READ commands and a Write State Machine for controlling the processing of all WRITE commands.

7 Claims, 18 Drawing Sheets

DISK DRIVE SYSTEM INTERFACE ARCHITECTURE EMPLOYING STATE MACHINES

BACKGROUND OF THE INVENTION

1. Field of the Invention

The present invention relates generally to digital data storage systems and more particularly to an AT interface architecture employing state machines for use in a digital data storage system. More particular still, the invention relates to a flash solid state memory system that employs the AT interface architecture comprising state machines.

2. Description of the Related Art

Magnetic disk drives have been widely accepted in the computer industry and are used for storing large amounts of data. Over the years, magnetic disk drives have decreased in size while increasing in operational speed and in the amount of data that can be stored on the magnetic media. Magnetic disk drives have associated with them a seek latency time which is associated with the time necessary to move the desired transducer to the desired track or cylinder on the magnetic media for the purpose of recovering or writing data to and from the magnetic media. In addition, there is a rotational latency associated with waiting for the desired data sector to pass underneath the transducer once the transducer is located on the desired track. Magnetic disk drives also have the associated problems of relying on mechanical hardware for locating the transducer at a specific location with regards to the magnetic media and for maintaining the rotational speed of the magnetic media at some constant value. The mechanical hardware is affected by the normal wear and tear associated with mechanical devices. Further, magnetic disk drives have employed various track following servo systems for maintaining the transducer on a desired track once the transducer reaches that desired track. Finally, the magnetic disk drive tracks are divided into a fixed number of sectors where each sector stores a fixed number of data bytes. As a rule, magnetic disk drive systems will write a complete sector each time a sector is written. Where the data is less than a full sector the data is padded with zeros to fill up the sector. This is to say that if the sector length is 512 bytes, whenever a sector is written 512 bytes of data will be written into that sector. The requirements of writing a full sector every time a sector is written means that a substantial portion of the magnetic surface may be allocated to contain filler data rather than useful data. Finally, it can readily be realized that the data would also be recovered from the magnetic disk drive in sector lengths and, therefore, a full sector must be read from the disk regardless of the actual amount of useful data that was recorded in that sector.

With the advent of solid state memories, attempts have been made to emulate the magnetic disk drives by use of solid state memories in place of the magnetic media. Examples of such emulations are found in U.S. Pat. No. 4,642,759 entitled "Bubble Memory Disk Emulation System" and U.S. Pat. No. 5,131,089 entitled "Solid State Disk Drive Emulation".

The ideal system would use a solid state memory that is nonvolatile such as the above-referenced bubble memory or the solid state memory with its own power supply to maintain the stored data even though power is turned off to the drive. However, each of these solid state memories each have their own advantages and disadvantages which must be weighed in selecting which solid state memory should and could be used in a specific design.

To have a solid state drive emulate a magnetic disk drive, the solid state storage media must be transparent to the host. Ideally, the solid state drive would accept the same commands and data formats as the magnetic disk drive such that no change in programming or system configuration need be done within the host. A disadvantage associated with most solid state memories is the time necessary to write into the memory. The slow write speed is a major reason why the solid state drives emulating magnetic disk drives have not been more widely accepted and marketed within the industry.

At present, both in magnetic disk drives and in flash disk drives, a microcontroller is employed for controlling the operation of the storage system. One of the functions of the microcontroller is to control the transfer of data across the host interface between the host processor and the storage media within the drive system. This requires that the microprocessor dedicate resources to transfer data between the host computer and the storage system across the interface in response to READ and WRITE commands. This requirement limits the microprocessor's availability to perform other functions and, therefore, results in a limitation on the overall system performance of the storage system. In magnetic disk drive storage systems, some attempts have been made to unburden the microprocessor by transferring some of the functions of the microprocessor to state machines or to have a two microprocessors involved in performing the functions thereby reducing the workload on each microprocessor and allowing two functions to be in process at the same time. In particular, the flash solid state drive system requires the microprocessor to be involved in housekeeping operations with regard to the flash memory, as well as controlling the reading and writing of data from the memory buffer to the flash memory itself. This increased responsibility on the microprocessor further reduces the system performance due to the time necessary to perform the increased functions allocated to the microprocessor.

SUMMARY OF THE INVENTION

Accordingly, it is an object of the invention to provide an AT interface architecture comprised of state machines such that the microprocessor is not involved in the transfer of data between the host and the buffer within the storage system.

Another object of the invention is to provide a Read State Machine, a Write State Machine, a Byte Count State Machine and an Update Task File State Machine which perform and control the transfer of data between the system and the host across the host interface.

Another object of the invention is the coaction between the Read State Machine, the Byte Count State Machine and the Update Task File State Machine for controlling the transfer of data during a READ operation, that is the transfer of data from the buffer within the storage system to the host.

Still another object of the invention is the coaction between the Write State Machine, the Byte Count State Machine and the Update Task File State Machine during a WRITE operation, that is the transfer of data from the host to the buffer within the storage system.

Briefly, there are four state machines in the AT interface architecture that are used to control the overall operation of data transfer to and from the host. A Write State Machine controls the overall operation of write commands, ie write sectors, write sector long, write multiple, write buffer, or write DMA. A Read State Machine controls the operation of the read commands, ie read sectors, read sector long, read multiple, read buffer, or read DMA. An Update Task File State Machine tracks the number of sectors processed and then generates; a signal to increment the sector address. A Byte Count State Machine controls the conversion of words to bytes and the transfer of data between the host and the storage system.

The operation of the four state machines are intertwined. The Read and Write State Machines control the overall operation of the data transfer and are mutually exclusive. At the point of the transfer for either a READ or WRITE operation where the task file needs to be updated, the Read or Write State Machine will initiate a cycle of the Update Task File State Machine. When either the Read or Write State Machines are started, the Byte Count State Machine is activated. The Byte Count State Machine generates pulses to decrement the byte counter every time that a byte of data is transferred to or from the data register to control the transfer of data during a READ or WRITE operation. The Read and Write State Machines hold in their cycle awaiting for the byte count to go to zero as controlled by the Byte Count State Machine. The Read State Machine issues a gate first word signal to tell the byte count machine to stage the first two bytes into the data register so that the first two bytes will be ready when the host starts reading data.

The state machines interact with the AT registers. The task file count register is used to keep the number of sectors transferred. The head and sector configuration registers are used to tell when the task file and sector registers should be wrapped. The byte count register, which is fed from the ECC size register and the transfer size register, is used to count the number of bytes in the sector or the number of ECC bytes to be transferred. The block count register is loaded with a one for all but the read multiple command and for a read multiple command with the number of sectors to be transferred in each block. The byte count register generates signals when the byte count register contains either a zero or a one.

An advantage of the AT interface employing state machines is that the microprocessor within the storage system is relieved of the task of controlling the transfer of data to and from the host processor from the memory buffer within the storage system, thereby increasing system performance.

BRIEF DESCRIPTION OF THE DRAWINGS

The invention will be described with respect to the particular embodiments thereof and references will be made to the drawings, in which.

DESCRIPTION OF THE PREFERRED EMBODIMENTS

SYSTEM ARCHITECTURE

Figure 1:
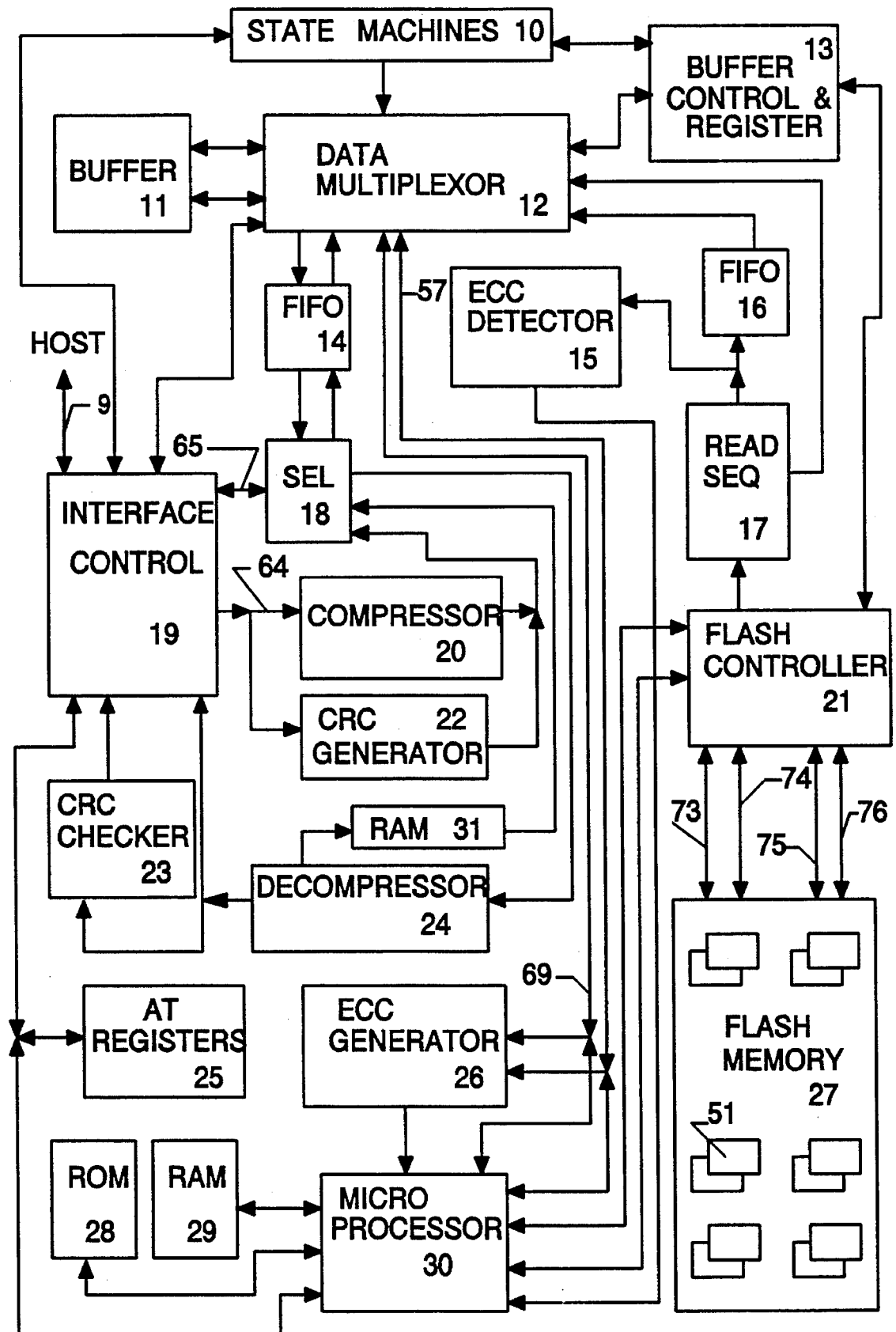
FIG. 1 is a logic diagram of the flash solid state drive.

FIG. 1 is a logic diagram showing the components of the flash solid state drive. The flash solid state drive is 100% hardware and software compatible with ATA/IDE Interface standards and will support all mandatory AT-Attachment standard commands.

Flash memory 27 is comprised of thirty Intel 28F008 flash chips 51 where the chip data size is 8 Mb and 8 bits of data are simultaneously written into or read from the flash chip. Two flash chips are paired together and addressed at the same time such that 16 bits may be written or read simultaneously into or from the flash memory. To accomplish this flash controller 21 is dual ported so as to provide both address and data to each flash chip of a chip pair by means of lines 73 through 76. The flash solid state drive is controlled by microprocessor 30 in conjunction with an operating program stored in ROM 28. Microprocessor 30 is also connected to RAM 29 to allow the dynamic storing of data necessary for controlling the operation of the drive. Microprocessor 30 is connected to AT registers 25, to interface control circuitry 19, to flash control 21, to data multiplexer 12, to ECC generator 26, to buffer control and registers 13 and to ECC detector 15.

For a write operation, data for a sector is received from the host on bus 9 to interface control 19. If the sector data is to be compressed, the sector data is transferred via line 64 to compressor 20 for data compression and through CRC generator 22 for generating CRC data. Data compressor 20 is a LEMPAL/ZIV type data compressor. The compressed sector data, after being compressed, is stored in buffer 11. After the compressed sector data has been stored in buffer 11 the CRC data byte is stored in buffer 11 and made part of the data associated with the sector being stored.

If the sector data was not to be compressed, then the sector data would leave interface control 19 on line 65 and pass directly through selector 18, FIFO 14 and data multiplexer 12 into buffer 11. State machines 10 contains a Write State Machine which controls the sequence of operations during a write operation. Once the data for the sector, either compressed or uncompressed, has been stored in buffer 11, the Write State Machine will then transfer the sector data from data multiplexer 12 to microprocessor 30. Microprocessor 30 acts as a dual port microprocessor where the ports are connected to data multiplexer 12 by means of buses 57 and 69. When sector data is transferred from buffer 11 to microprocessor 30 the sector data is also passed through ECC generator 26 to generate the ECC data. The ECC data is also provided to microprocessor 30. Microprocessor 30 transfers the sector data and ECC data as data words, where each data word consists of two bytes of data, to flash controller 21. Microprocessor 30 performs the task of taking two sequential bytes of sector data from buffer 11 or ECC data and forming data words for flash controller 21. Flash controller 21 then writes the data word into the flash memory 27.

During a read operation, the read command is received from the host on bus 9 by interface control 19. State machine 10 includes a Read State Machine which controls the sequence of operation during the read procedure. The data is read from flash memory 27 by flash controller 21 in data word format. Read sequencer 17 receives the data word and provides sequentially each of the two bytes of data making up the received data word to speed matching buffer FIFO 16. Read sequencer 17 also routes the data bytes to ECC detector 15 for the detection of an error in the read data. The output of FIFO 16 is routed through multiplexer 12 to buffer 11. When the data for a sector has been stored in buffer 11 and no data error was detected by ECC detector 15, the sector data is then directed from buffer 11 through data multiplexer 12 and speed matching buffer FIFO 14 to selector 18. If the sector data was compressed, then the sector data is routed from selector 18 through decompressor 24. The decompressed sector data from decompressor 24 is routed to CRC checker 23 and to interface control 19 for transmission to the host. If CRC checker 23 detects a CRC error, a flag is raised to the host indicating that an error exists in the sector data that was transmitted for that sector. If the read sector data was not compressed, selector 18 will route the sector data via line 65 to interface control 19 which will then route the data to the host via bus 9.

State machines 10 also contains a between sector state machine for updating the task file registers and a Byte Count State Machine for maintaining of the number of bytes of data transfer during a read or write operation.

AT registers 25 and buffer control registers 13 are used to control the sequence of operation in conjunction with the microprocessor performing the operation program as stored in ROM 28 and the operation of the various state machines. Buffer control and registers 13 include a tie breaking state machine to resolve conflicts in the data multiplexer 12 for access to buffer 11 and a buffer signal state machine for controlling the reading and writing of data into and out of buffer 11.

The function of and description of the AT registers 25 and buffer registers 13 are as follows:

AT REGISTERS

1. TASK FILE ERROR REGISTER

This register is the error indicating register to the Host. It has bit significance except at power on or during the diagnostic command. It is a read only register to the Host.

bit 7 - Bad Block bit 6 - ECC Data Check bit 4 - ID Not Found bit 2 - Aborted Command bit 1 - Track 0 Not Found bit 0 - Address Mark Not Found

2. TASK FILE PRECOMP REGISTER

This register is a write only register to the Host. It was previously used to indicate at what cylinder to begin precompensation. It is used for other commands at this point in time.

3. TASK FILE COUNT REGISTER

The register is used by the Host to indicate how many sectors are to be transferred on a read or write command.

4. TASK FILE SECTOR REGISTER

This register contains the logical sector requested by the host.

5. TASK FILE SDH REGISTER bit 4 - Drive address bit 3 - Head bit 8 bit 2 - Head bit 4 bit 1 - Head bit 2 bit 0 - Head bit 1

6. TASK FILE CYLINDER LOW REGISTER

This register and the following register contain the cylinder requested by the Host.

7. TASK FILE CYLINDER HIGH REGISTER

8. COMMAND REGISTER

This register is used by the Host to communicate the desired command. When either the Host or the drive write this register, the drive will become busy. When the drive is busy, only the drive may write the task file. When the drive is not busy, only the Host may write the Task File unless the drive writes 0D bit 3 to enable the microprocessor access to the Task File registers.

9. SECTOR CONFIGURATION REGISTER

This is a 8 bit register used to determine the sector wrap point for the Host values.

10 HEAD CONFIGURATION REGISTERS

This is a 4 bit register used to determine the head wrap point for the Host values.

bit 3 - Head bit 8 bit 2 - Head bit 4 bit 1 - Head bit 2 bit 0 - Head bit 1

11. DIGITAL ADDRESS REGISTER

This register is the same as that read at 3F7 by the Host with the exception that bit 7 is a one instead of tristate as it is to the interface.

bit 7 - Always 1 bit 6 - Always 1 bit 5 - Head bit 3~ bit 4 - Head bit 2~ bit 3 - Head bit 1~ bit 2 - Head bit 0~ bit 1 - Drive 1~ bit 0 - Drive 0~

12. AT CONTROL REGISTER

This register contains status bits for use by the microcode. It is read only.

bit 7 - Sector>maximum logical sector

This bit contains the result of a comparison of the Task File Sector Number register and the Sector configuration register.

bit 6 - Head>maximum logical head

This bit contains the result of a comparison of the Task File SDH register head value and the Head configuration register.

bit 5 - Count equal to 0

This bit is 1 when the Task File Count Register is equal to 0.

bit 4 - ECC Error

This bit is 1 when an ECC error is detected. The ECC should be reset by toggling AT Res 1 in the Microprocessor's reset register before continuing.

bit 3 - Byte count equal to 0

This bit is one when the transfer count register that counts the number of bytes to be transferred on the interface is=0.

bit 2 - IOR & IOW equal to 0

This bit is for use in PCMCIA interfaces. It is 1 when both IOR & IOW are active low at the same time.

bit 1 - Task file update state 1

This bit and bit 0 contain the status of the task file update state machine. It is triggered by the read or write state machines and normally should not be able to be seen changing. It should always be in state 00.

bit 0 - Task file update state 0

13. TASK FILE STATUS REGISTER

This register which is a read/write register used to access the Task File register which provides a summary status of the drive. All bits are read/write.

bit 7 - Busy
bit 6 - Ready
bit 5 - Write Fault
bit 4 - Seek Complete
bit 3 - Data Request
bit 2 - Corrected data
bit 1 - Index
bit 0 - Error bit

14. INTERFACE CONTROL REGISTER bit 7 - Host PDIAG Out

This bit, when set to 1, drives the Host PDIAG signal active low. It is bit settable.

bit 6 - LED/Drive Slave Present

This bit, when set to 0, drives the DASP signal low to the interface.

bit 5 - Processor Host Interrupt Enable

This bit may be set to 1 to force the Host interrupt to be enabled. It should be reset to allow the Host to enable or disable the drive's interrupt.

bit 4 - OK to continue

This bit is used by the processor to allow a multiple sector read or write to continue. Normally it should be set to 1 at initialization. If sector automation is to be inhibited, this bit should be set to zero. Then, between sectors, the bit pulse, CONTINUE R/W 0E, bit 3, is pulsed to continue the R/W.

bit 3 - Enable microprocessor access to the Task File Registers.

This bit is used by the processor to enable it to access the Task File even when the drive is not busy. Normally, this bit is not ever used.

bit 2 - INDEX.

This bit is routed to the status register to simulate the index of a drive. For the flash drive it should not be needed.

bit 1 - C~/D.

The address bit of the drive. Is set to 0 for drive C or 0 and to 1 for drive 1 or D. This bit is used to route status and is compared to the bit in the SDH register to determine the addressed drive.

bit 0 - Slave Present.

This bit is used to indicate that a second drive is present. It is set during a reset sequence when dual drive is detected. It is used to route status because if the second drive is not present, the master drive, drive 0, is responsible to return 00 for status. Setting this bit allows the hardware to return this status.

15. BIT PULSES REGISTER

This register is setup to allow bit operations to be done. When it is read, it always returns FFh. To pulse any of these bits, a zero is written.

bit 7 - Set Host IRQ.

This bit sets the Host interrupt which is gated by the Host interrupt enable.

bit 6 - Reset Long.

This reset is used to reset the Long bit, set by the Host when it does either a read or write long.

bit 5 - Reset Read/Write Mode.

This bit resets both read and write modes and the Data Request bit.

bit 4 - Set Read Mode.

This bit sets read mode. It is the only bit required to kick off a read operation if all other initialization has been accomplished.

bit 3 - Continue R/W.

This bit is used when the sector automation is disabled, register 0D bit 4 set to 0. to allow the next sector to begin.

bit 2 - Increment Block Release

This is the drive side pulse used to increment the Sectors Available Register 40 on a read and to decrement it on a write.

bit 1 - Increment Transfer Release.

This is the Host side pulse used to decrement the Sectors Available Register 40 on a read and to increment it on a write.

bit 0 - Set Write Mode.

Used to set Write Mode. This bit is used by the microprocessor to start any non-autowrite write operation.

16. INTERFACE BITS REGISTER

This is a collection of bits that are useful for interface operation.

bit 7 - Host IRQ.

This is the Host IRQ bit just before it goes to the output drivers.

bit 6 - Host Interrupt Enable.

This is the Host Interrupt Enable bit just before it goes to the output drivers.

bit 5 - Host PDIAG In.

This bit comes from the PDIAG line just on the input side of the Host input receivers.

bit 4 - Long

This bit is the long bit set by the Host when it does either a read or write long operation.

bit 3 - HIO16

This is the HIO16 line just before it goes to the Host interface.

bit 2 - Write Mode

The Write mode latch.

bit 1 - Read Mode

The Read Mode latch.

bit 0 - Drive Slave Present In.

The drive slave present line at the input receiver lines.

17. ECC 1 GENERATION 4

This register and the following three registers are the registers where the ECC Generator 1 result is stored. To produce the correct ECC value, the registers should be initialized to F0, 0F, 00, FF respectively before the data is read by the microprocessor from Port 1 of the Buffer. It is possible to interrupt the ECC generation by saving away the current contents of the registers and then restoring them to continue.

18. ECC 1 GENERATION 3
19. ECC 1 GENERATION 2
20. ECC 1 GENERATION 1
21. ECC 2 GENERATION 4

This register and the following three registers are the registers where the ECC Generator 2 result is stored. To produce the correct ECC value, the registers should be initialized to F0, 0F, 00, FF respectively before the data is read by the microprocessor from Port 1 of the Buffer. It is possible to interrupt the ECC generation by saving away the current contents of the registers and then restoring them to continue.

22. ECC 2 GENERATION 3
23. ECC 2 GENERATION 2
24. ECC 2 GENERATION 1
25. ECC DETECTION 4

The ECC Detection automatically loads the polynomial into this register and the following 3 registers and then calculates the ECC on the read data. The hardware then automatically triggers the compare on the ECC bytes read at the end of the sector.

26. ECC DETECTION 3
27. ECC DETECTION 2
28. ECC DETECTION 1
29. TRANSFER LENGTH LOW REGISTER

This register and the following one, control the length of each sector transfer. It is normally set only at power on time. This register is used to measure the length of the sector transfer.

30. TRANSFER LENGTH HIGH REGISTER
31. 22 - BIT PULSES 2

This register is setup to allow bit operations to be done. When it is read, it always returns FFh. To pulse any of these bits, a zero is written.

bit 7 - Last Transfer.

This bit is used to force the AT automation to end the transfer at the end of the current sector or block.

bit 6 - Start Compressor.

This bit provides the capability to start the compressor in the non-autowrite case. One of its principle other uses will be to start the compressor to rewrite a sector that has expanded back to the buffer as a non-compressed sector.

32. AT DATA 1 REGISTER bit 7 - Disable compression

This bit disables the compression circuitry when set. When compression is disabled, a sectors are transferred as 512 byte sectors.

bit 6 - PIO Mode

When this bit is set, Host data transfers are done in PIO mode. This bit enables the IO16 circuitry when set.

bit 5 - EISA DMA Mode

This bit enables EISA DMA Mode. It controls how the Host Interface to drive handshaking is done on read and write DMA commands. When this bit is set DMA transfers are accomplished with Host DMA Request and Host DMA Acknowledge remaining active for the entire transfer although the Host will drop Host DMA Acknowledge when it does a refresh cycle.

bit 4 - ISA DMA Mode

This bit enables ISA DMA Mode. It controls how the Host Interface to drive handshaking is done on read and write DMA commands. When this bit is set DMA transfers are accomplished with Host DMA Request and Host DMA Acknowledge toggling on every word transfer.

bit 3 - Multiple Mode

This bit is set when the Host issues a Set Multiple Command, C6h. It enables multiple operations in the ASIC hardware.

bit 2 - Host DMA Enable

This bit is only used by the microprocessor when connected to a Compaq computer that requires this signal to initiate a DMA read/write transfer.

bit 1 - Disable Autowrites

When set this bit, autowrites are disabled. Disabling autowrites requires that the microprocessor set Write Mode, by clearing register 0E, bit 4.

bit 0 - Disable CRC

When set this bit disables the CRC check. It also disables writing the CRC bit.

33. CRC REGISTER

This register contains the CRC byte. It is valid at the end of a sector until the start of the next sector.

34. BLOCK SIZE REGISTER

This register contains the number of sectors in a block on a read/write multiple. It is set by the microprocessor when the Host issues a C6h, Set Multiple Command. It is used by the AT ASIC circuitry to control the number of sectors to be transferred under a single DRQ.

35. ECC LENGTH REGISTER

This register controls the length of the transfer of the ECC bytes during a long read or write command. It is usually only set during reset, but may also be modified by the Host, Set ECC Length. This register is used by the AT circuitry of the ASIC.

36. BYTE COUNT LOW REGISTER

This register and the following register are the actual transfer length registers. They are loaded by the AT circuitry of the ASIC with either the contents of Transfer Length Register or the ECC Length Register dependent upon if the data or the ECC bytes are being transferred.

37. BYTE COUNT HIGH REGISTER
38. BLOCK COUNT REGISTER

This register is used in read or write operations and is loaded with either 1 if the operation is to be a normal read or write command, the block size register for a read or write multiple command where the remaining sectors to be transferred is greater than the block size, or the Task File Count for a read or write multiple operation where the number of sectors remaining to be transferred is less than the block size.

39. READ WRITE STATES REGISTER

This register contains the current state of both the read and write state machines that are used to control any read or write operation to or from the host. The upper nibble contains the write states and the lower nibble contains the read states.

bit 7 - Wa
bit 6 - Wb
bit 5 - Wc
bit 4 - Wd
bit 3 - Rw
bit 2 - Rx
bit 1 - Ry
bit 0 - Rz

40. SECTORS AVAILABLE REGISTER

This register maintains a count of the number of sectors available to the Host on a read operation and the number of sectors available to the drive on a write operation. It may be loaded by the microprocessor. It is reset on an autowrite unless they are disabled.

41. SEGMENT SIZE REGISTER

This register contains the current size of the buffer segment. It is set by the microprocessor. It is used by the AT circuitry in the ASIC to determine if there is any additional room in the segment to place data.

42. BETWEEN SECTOR DELAY REGISTER

This register is used to control the amount of delay, in 400 ns increments, between sectors on multiple block read and write operations.

BUFFER REGISTERS

1. START POINTER LOW BYTE 1

This and the next register makes up the start pointer to the ram buffer for the first port of the microprocessor. It is reset to 00000 on the assertion of sector reset buffer 1. This register's upper address bits 12–15 are bounded by the buffer size register so that the start pointer will only contain valid addresses for the buffer size selected. This register is loaded into the microprocessor #1 address registers when the address pointer equals the microprocessor wrap pointer.

2. START POINTER HIGH BYTE 1

3. WRAP POINTER LOW BYTE 1

This and the next register are the wrap pointer to the ram buffer for the first port of the microprocessor. It is reset to 00000 on the assertion of sector reset buffer 1. This register's upper address bits 12–15 are bounded by the buffer size register so that the wrap pointer will only contain valid addresses for the buffer size selected. This register is loaded with the address that the programmer wants to cause a wrap condition on.

4. WRAP POINTER HIGH BYTE 1

5. ADDRESS POINTER LOW BYTE 1

This and the next register makes up the address pointer to the ram buffer for the first port of the microprocessor. This pointer is incremented to the next address upon each access to the ram. It is reset to 00000h on the assertion of sector reset buffer 1. This register's upper address bits 12–15 are bounded by the buffer size register so that the address pointer will only contain valid addresses for the buffer size selected. The microprocessor #1 start and wrap pointers can be used to select a wrap point inside the ram buffer. When the address pointer equals the wrap pointer the Start pointer is loaded for the next ram access.

6. ADDRESS POINTER HIGH BYTE 1

7. BUFFER CONTROL 1

This register contains the controls and status of port 1 of the microprocessor.

bit 7 - U1PROG~(R)

Progress bit. Bit7=0 then the data in the data register is not valid yet. Bit7=1 Data is valid in the data register.

bit 2 - ECC ENABLE

This bit when set will cause the data being read from this port to be clocked into the ecc generator. If the bit is clear data will not be clocked into the ecc generator.

bit 1 - U1STRT (W/R)

Port activation bit. Bit 1=0. Any read or writes to the data register will cause no action to be taken. Bit 1=1. If bit 0=0 and the data register is written data will be transferred to the ram. If bit 0=1 then an immediate fetch of the first byte will be performed and there after a new byte will be fetched upon reading the data register.

bit 0 - U1DIRW~/R (W/R)

The direction of the port. Bit 0=0 a write is performed to the ram. Bit 0=1 a read is performed.

8. DATA REGISTER

This is the data register for first microprocessor port. If microprocessor port #1 is active then a read of this register will pass data read from the ram and start off another fetch operation to the ram. A write to this register will place the written data into the ram.

9. START POINTER LOW BYTE 2

This and the next register makes up the start pointer to the ram buffer for the first port of the microprocessor. It is reset to 00000 on the assertion of sector reset buffer 1. This register's upper address bits 12–15 are bounded by the buffer size register so that the start pointer will only contain valid addresses for the buffer size selected. This register is loaded into the microprocessor #1 address registers when the address pointer equals the microprocessor wrap pointer.

10. START POINTER HIGH BYTE 2

11. WRAP POINTER LOW BYTE 2

This and the next register makes up the wrap pointer to the ram buffer for the first port of the microprocessor. It is reset to 00000 on the assertion of sector reset buffer 1. This register's upper address bits 12–15 are bounded by the buffer size register so that the wrap pointer will only contain valid addresses for the buffer size selected. This register is loaded with the address that the programmer wants to cause a wrap condition on.

12, WRAP POINTER HIGH BYTE 2

13. ADDRESS POINTER LOW BYTE 2

This and the next register makes up the address pointer to the ram buffer for the first port of the microprocessor. This pointer is incremented to the next address upon each access to the ram. It is reset to 00000 on the assertion of sector reset buffer 1. This register's upper address bits 12–15 are bounded by the buffer size register so that the address pointer will only contain valid addresses for the buffer size selected. The microprocessor #1 start and wrap pointers can be used to select a wrap point inside the ram buffer. When the address pointer equals the wrap pointer the Start pointer is loaded for the next ram access.

14. ADDRESS POINTER HIGH BYTE 2

15. BUFFER CONTROL 2

This register contains the controls and status of port 2 of the microprocessor.

bit 7 - U1PROG~ (R)

Progress bit. Bit7=0 then the data in data register is not valid yet. Bit 7=1 Data is valid in data register.

bit 2 - ECC ENABLE

This bit when set will cause the data being read from this port to be clocked into the ecc generator. If the bit is clear data will not be clocked into the ecc generator.

bit 1 - U1STRT (W/R)

Port activation bit. Bit 1=0. Any read or writes to the data register will cause no action to be taken. Bit 1=1. If bit 0=0 and the data register is written data will be transferred to the ram. If bit 0=1 then an immediate fetch of the first byte will be performed and there after a new byte will be fetched upon reading the data register.

bit 0 - U1DIRW~/R (W/R)

The direction of the port. Bit 0=0 a write is performed to the ram. Bit 0=1 a read is performed.

16. DATA REGISTER 2

This is the data register for second microprocessor port. If microprocessor port #2 is active then a read of this register will pass data read from the ram and start off another fetch operation to the ram. A write to this register will place the written data into the ram.

17. INTERFACE START POINTER LOW WORD

This and the next register makes up the start pointer to the ram buffer for the interface port. It is reset to 00000 on the assertion of sector reset buffer 1. This register's upper address bits 12–15 are bounded by the buffer size register so that the start pointer will only contain valid addresses for the buffer size selected. This register will be loaded into the interface address pointer upon a successful compare of the interface address pointer with the interface wrap pointer.

19. INTERFACE START POINTER HIGH WORD
20. INTERFACE WRAP POINTER LOW WORD

This and the next register makes up the wrap pointer to the ram buffer for the interface. It is reset to 00000 on the assertion of sector reset buffer 1. This register's upper address bits 12–15 are bounded by the buffer size register so that the wrap pointer will only contain valid addresses for the buffer size selected. This register is loaded with the address that the programmer wants to cause a wrap condition on.

21. INTERFACE WRAP POINTER HIGH WORD
22. INTERFACE ADDRESS POINTER LOW WORD

This and the next register makes up the address pointer to the ram buffer for the interface. This pointer is incremented to the next address upon each access to the ram. It is reset to 00000 on the assertion of sector reset buffer 1 or upon receiving an autowrite pulse. This register's upper address bits 12–15 are bounded by the buffer size register so that the address pointer will only contain valid addresses for the buffer size selected. The interface start and wrap pointers can be used to select a wrap point inside the ram buffer. When the address pointer equals the wrap pointer the Start pointer is loaded for the next ram access. This loading of the address pointer to 00000 by receiving an autowrite can be disabled by setting bit2 of the interface buffer control register.

23. INTERFACE ADDRESS POINTER HIGH WORD
24. INTERFACE BUFFER CONTROL

This register contains the controls and status of the interface buffer port.

Bit 7 - IFPROG~ (R)

Interface access to ram. Bit 7=0 when an access to the buffer ram is in progress. Bit 7=1 when interface port is idle.

Bit 6 - FIFO FULL (R)

Bit 6=0 When there is room in the sector count FIFO for releases. Bit 6=1 When the sector count FIFO is full and can not accept any more entries.

Bit 5 - FIFO EMPTY (R)

Bit 5=1 when the sector count FIFO is empty. Bit 5=0 when there is data in the sector count FIFO Bit 4 - RESET FIFO Bit 4=1 then the sector count FIFO is held in reset. Bit4=0 the sector count FIFO is free to be loaded.

Bit 2 - AUTOWRITE~ (W/R)

Autowrite load of start pointer. Bit2=0 will cause the start pointer to be loaded into the address pointer if an autowrite is received Bit2=1 will inhibit the load of the start pointer into the address pointer on autowrites.

Bit 1- IFACT (R)

Interface port active. Bit 1=0 the interface port is not active. Bit 1=1 means the interface port is active.

Bit 0- IFDIRW~/R (R)

Interface direction. Bit 0=0 the data is flowing from the interface to the buffer. Bit 0=1 the data is flowing from the buffer to the interface. This bit is only valid if Bit 1=1.

25. SECTOR COUNT LOW

This and the next register forms the sector count register port. The nine bits contain the number of bytes in the sector that is being released. This register is a port to a 16 word×10 bit FIFO. Sixteen sector counts can be stored up at a time. Bit 6 of register 24 returns the status of whether this FIFO is full. Both bytes must be written to load the 10-bit word in the FIFO. Bit 2 of the sector count high register is used to tell whether the sector that corresponds to this count is compressed or uncompressed. You set the bit to 1 for compressed data. Bits 11–15 are ignored but should be written as zero. The FIFO is reset and count purged if sector reset buffer 1 is asserted or if the interface deasserts its read_mode.

26. SECTOR COUNTER HIGH
27. READ SEQ START POINTER LOW WORD

This and the next register makes up the start pointer to the ram buffer for the read sequencer port. It is reset to 00000 on the assertion of sector reset buffer 1. This register's upper address bits 12–15 are bounded by the buffer size register so that the start pointer will only contain valid addresses for the buffer size selected. This register is loaded into the read sequencer address pointer upon a successful compare of the read sequencer address pointer to the read sequencer wrap pointer.

28. READ SEQ START POINTER HIGH WORD
29. READ SEQ WRAP POINTER LOW WORD

This and the next register makes up the wrap pointer to the ram buffer for the read sequencer. It is reset to 00000 on the assertion of sector reset buffer 1. This register's upper address bits 12–15 are bounded by the buffer size register so that the wrap pointer will only contain valid addresses for the buffer size selected. This register is loaded with the address that the programmer wants to cause a wrap condition on.

30. READ SEQ WRAP POINTER HIGH WORD
31. READ SEQ ADDRESS POINTER LOW WORD

This and the next register makes up the address pointer to the ram buffer for the read sequencer port. This pointer is incremented to the next address upon each access to the ram. It is reset to 00000 on the assertion of sector reset buffer 1. This register's upper address bits 12–15 are bounded by the buffer size register so that the address pointer will only contain valid addresses for the buffer size selected. The read sequencer start and wrap pointers can be used to select a wrap point inside the ram buffer. When the address pointer equals the wrap pointer the Start pointer is loaded for the next ram access.

32. READ SEQ ADDRESS POINTER HIGH WORD
33. READ SEQ CONTROL

Bit 7 - RSPROG~ (R)

Read sequencer ram access. Bit 7=0 the read sequencer is accessing the ram. Bit 7=1 the read sequencer is idle.

Bit 1 - RSACT~ (R)

Read sequencer active. Bit1=0 means there is data in the read sequencer FIFO. Bit 1=1 means there is no data in the read sequencer FIFO.

Bit 0 - RSDIRW~/R (R)

Read sequencer active. Bit 0 will always equal 0. Since the Read sequencer only writes to the buffer ram.

34. BUFFER CONTROL REGISTER

Bit 7 - ADDRESS HIGH~/BCS1 (W/R)

Address or buffer chip select. Bit7=0 the address high will be sent to the buffer ram. Bit 7=1 then BCS1 will be sent to the buffer ram in place of the high address.

35. BUFFER SIZE REGISTER

This register selects the size ram buffer the chip will access.

01 - 8K BUFFER

03 - 16K BUFFER

07 - 32K BUFFER

0F - 64K BUFFER

36. BUFFER COUNT REGISTER

This register contains the number of clock periods minus 1 that will be used to access the buffer ram. Only bits 0–3 are used.

SYSTEM OPERATION

The flash solid state drive operates under an operating system stored in ROM 28. The flash solid state drive performs various prodedures under the joint control of the operating system and the various state machines.

Figure 2A:
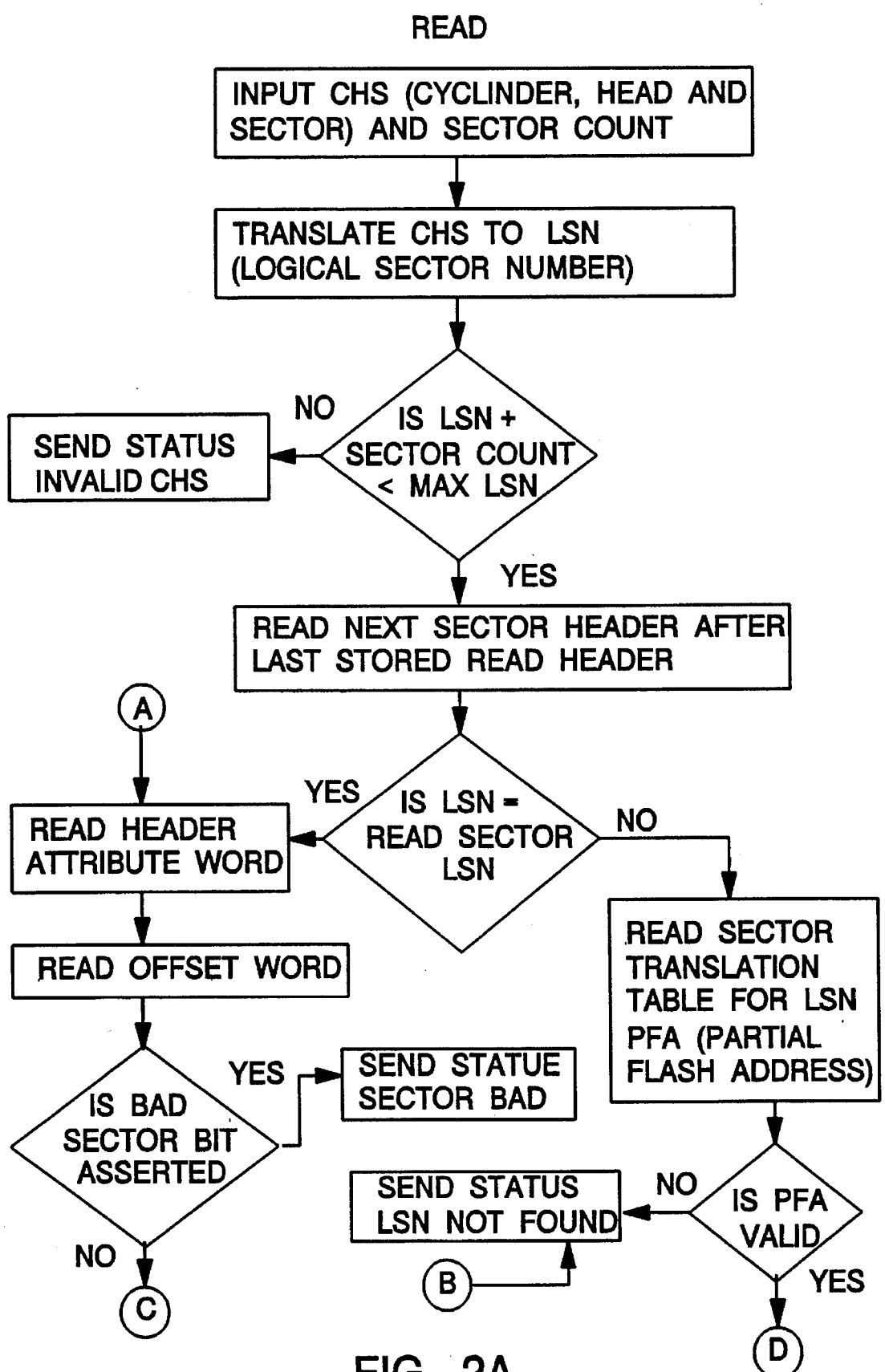
FIGS. 2A through 2C is a flow chart setting forth the operation of the flash solid state drive for a read operation.
Figure 2B:
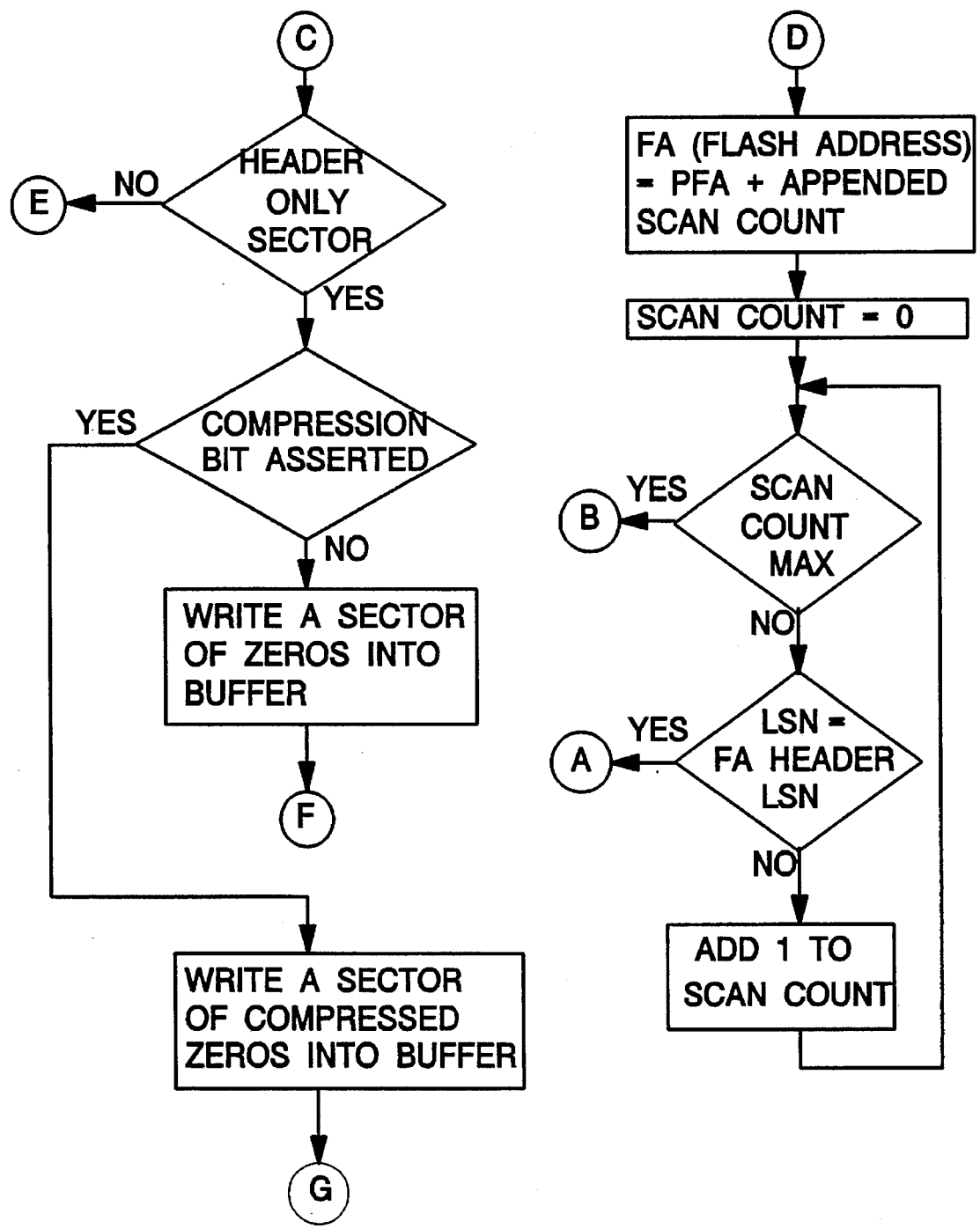
Figure 2C:
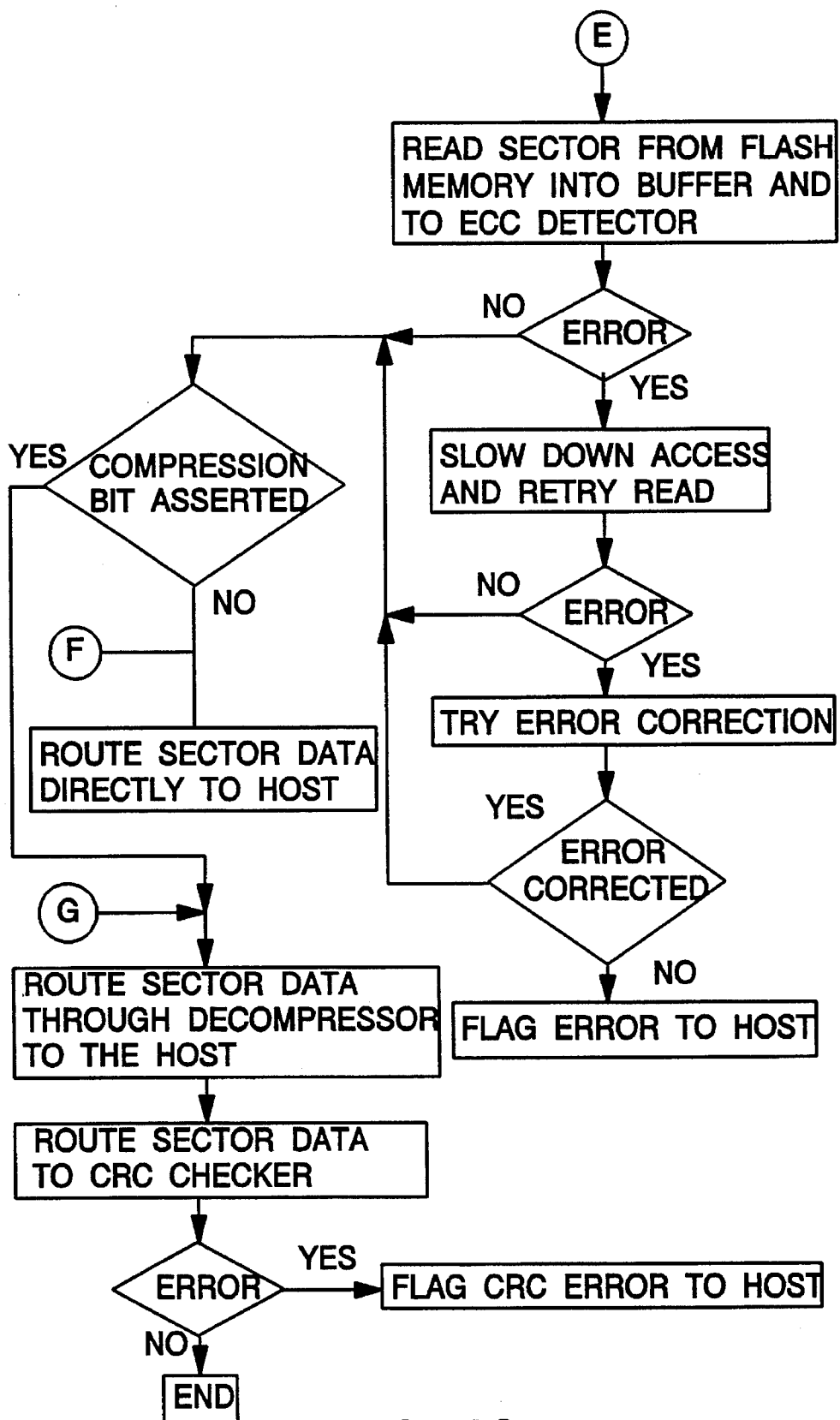

FIGS. 2A, 2B and 2C set forth the operation of the flash solid state drive for a read operation. The host sends to the flash solid state drive the read command, the sector count (the number of sectors to be read) and the cylinder, head and sector numbers (CHS address). Upon receiving the CHS address, the flash solid state drive will translate that CHS address into a logical sector number (LSN). Each sector that would have existed on the magnetic disk drive will have an associated LSN in the flash solid state drive. Therefore for the emulation of any magnetic disk drive, the flash solid state drive will have a maximum number of LSNs.

A test is performed which adds the received sector count to the generated LSN and compares that summation to the maximum LSN for the flash solid state drive. If the resulting summation is greater than the maximum LSN or if the generated LSN was equal to zero, then the CHS address sent by the host was in error. Under this condition the flash solid state drive will send status of invalid CHS to the host.

Each LSN has a header stored in the flash memory which identifies and describes the sector to the drive. When the drive is first manufactured, a sector header for each LSN is written in the flash array. A header for each LSN will always exists in the flash array and it is possible for more than one header for a given LSN to exist in the flash array however only one such header will be mark clean and the remaining duplicate headers will be marked dirty or invalid. During operation, the drive will store the location of the header of the last LSN read.

If the CHS sent by the host was valid, the drive will read the next header in the flash array after the sector header who's location in the flash memory was stored during the last read operation. The stored sector header location allows the drive to calculate the flash array address for the next header. Effectively, if the LSN stored in the next header is the LSN for the LSN to be read then the drive has avoided the time necessary to seek a flash memory address for the LSN.

Therefore a test is done to compare the LSN generated for this read operation against the LSN read from the next sector header after the last stored sector header during the last read operation. If there is no match, the drive will go to a sector translation table and read a partial flash address PFA for the LSN. The sector translation tables has stored for each LSN a PFA. The low three order bits of the complete flash address FA are not included within the PFA thereby reducing the width of the sector translation table by one byte. In the preferred embodiment the largest PFA stored in the sector translation table is address FFFE. The PFA for the LSN is checked to determine if the PFA has a value of FFFF which would indicate an error condition. If an error condition is sensed, status is sent to the host indicating that the CHS address was not found.

If the PFA is valid, the drive will add the value of a scan count multiplied by the header size to the PFA to form the FA. A scan count register is maintained within the drive for generating the complete offset for the FA. At this time, the scan count register will be made to be equal to zero. The scan count is then determined by the drive and if the scan count has a value of 0 to 7, the drive will read the header located at the FA and determine if the LSN being sought is equal to the LSN stored in the sector header. If the LSN being sought is different than the LSN stored in the header, 1 is added to the scan count and the process is repeated. This loop will be repeated until either the scan count reaches a count of 8 which will cause the drive to send status of CHS not found to the host or a match has been obtained between the LSN being sought and the LSN stored in the header being read at the flash address.

When either the condition that the LSN being sought was equal to the LSN stored in the next sector header after the last header stored from the previous read operation or the LSN in the header of the sector addressed in the flash memory, the drive will read the header. The header includes an attribute word and an offset word. The attribute word contains a bit that is set if the host has indicated that the sector was bad. If the bad sector bit is asserted, the drive will send status to the host indicating that the sector is marked bad. The offset word indicates the location of the data stored for that sector. If the attribute word indicates zero bytes of data, the drive will determine from the attribute word if the attribute word's compression bit is asserted. The compression bit indicates whether or not the sector data was compressed during the writing operation for storing that sector. If the compression bit was asserted, the drive will write a sector of compressed zero bytes into the buffer. If the compression bit was not asserted, the drive will write a sector, 512 bytes, of zeroes into the buffer. Since no data was stored within the flash memory, the drive generates the proper bytes of data to be stored into the buffer.

Where the attribute word indicates that data is stored after the header, the drive will read as data words from the flash memory the sector data, the CRC data,if any, and the ECC date. The offset word indicates the address at which the data is stored. As previously described, the flash memory is so arranged as to have the flash chips paired together such that 16 bits or two bytes of data may be read from the flash memory at a time. The offset provides the address at which the data starts in both of the flash chips. Data is stored on the flash chips starting at the address indicated by the offset and subsequent data words are read by incrementing the flash address for the first data word until all the data words are read for the sector. The data words are converted into two sequential bytes of data by the read sequencer 17 and each byte of sector data is read through multiplexer 12 into buffer 11. The bytes are routed through the ECC detector 15 and if an error is detected, the drive will slow down the access time to allow more settling time for the flash memory and retry reading the sector. If the retry was not successful, error correction techniques are then attempted to correct the error. If the error was not corrected, a flag is set indicating the error for the host.

If there was no error or if an error is corrected, then the drive will again determine whether the compression bit in the header was asserted. If the compression bit was not asserted, the buffer will contain 512 bytes of data and 4 bytes of ECC data. The drive will then route the uncompressed sector data through the data multiplexer 12, FIFO 14, selector 18 and interface control 19 to the host. If the compression data bit was asserted, the buffer will contain either the compressed data for the sector or a compressed sector of zeros, a CRC byte and 8 bytes of ECC data. The drive will route the compressed data from buffer 11 through data multiplexer 12, FIFO 14 and selector 18 to decompressor 24. Decompressor 24 decompresses the data and provides 512 bytes of data to interface control 19 to be transferred to the host. The output of the decompressor 24 is also sent through the CRC checker 23 which will determine if the decompressed data contains an error. If an error is detected by the CRC checker, a flag CRC error is posted to the host to indicate that the sector data just received by the host contains an error. The use of the CRC checker allows the drive to identify an error most likely occurring during either the compression or decompression of the sector data.

Figure 3A:
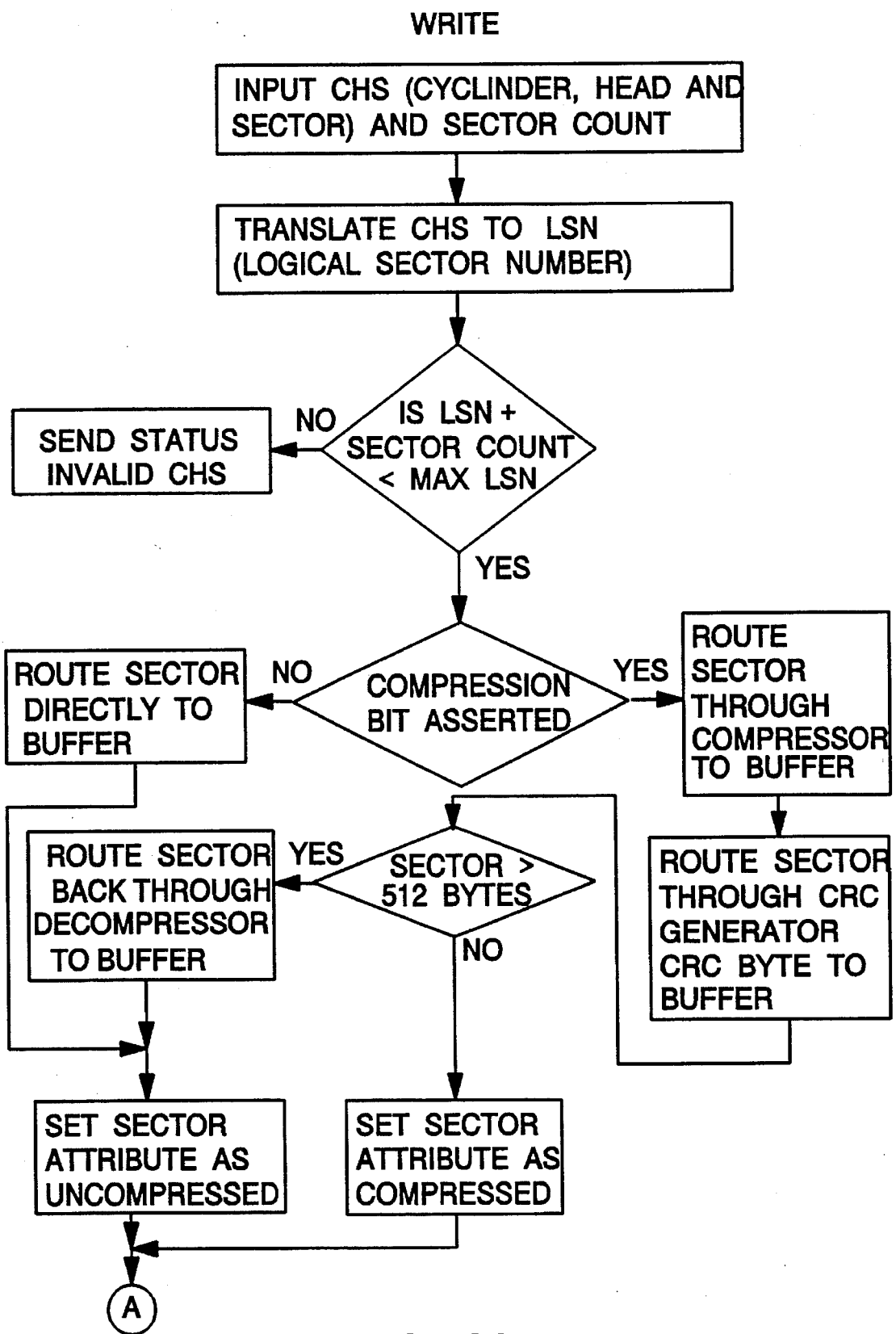
FIGS. 3A through 3C is a flow chart setting forth the operation of the flash solid state drive for a write operation.
Figure 3B:
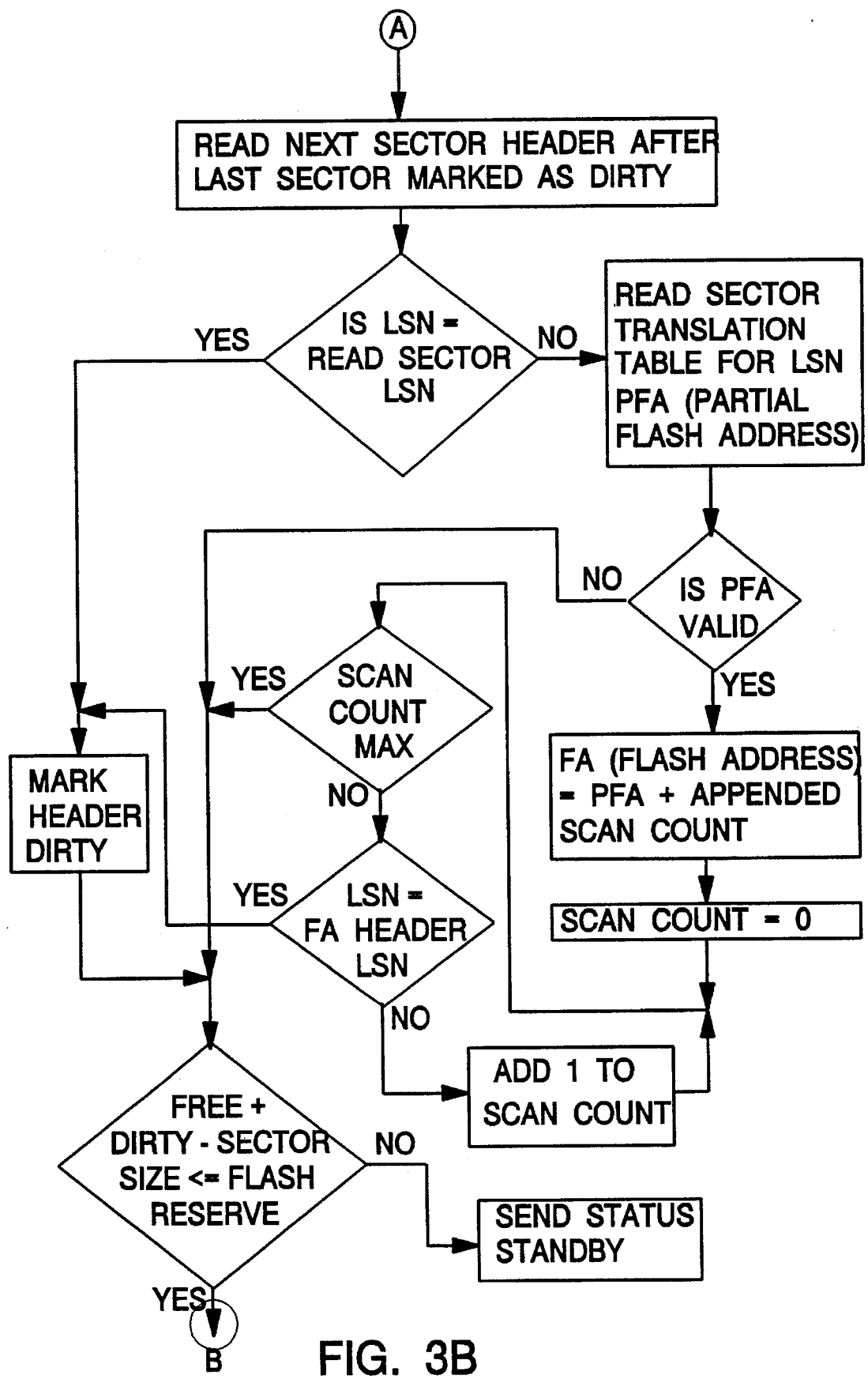
Figure 3C:
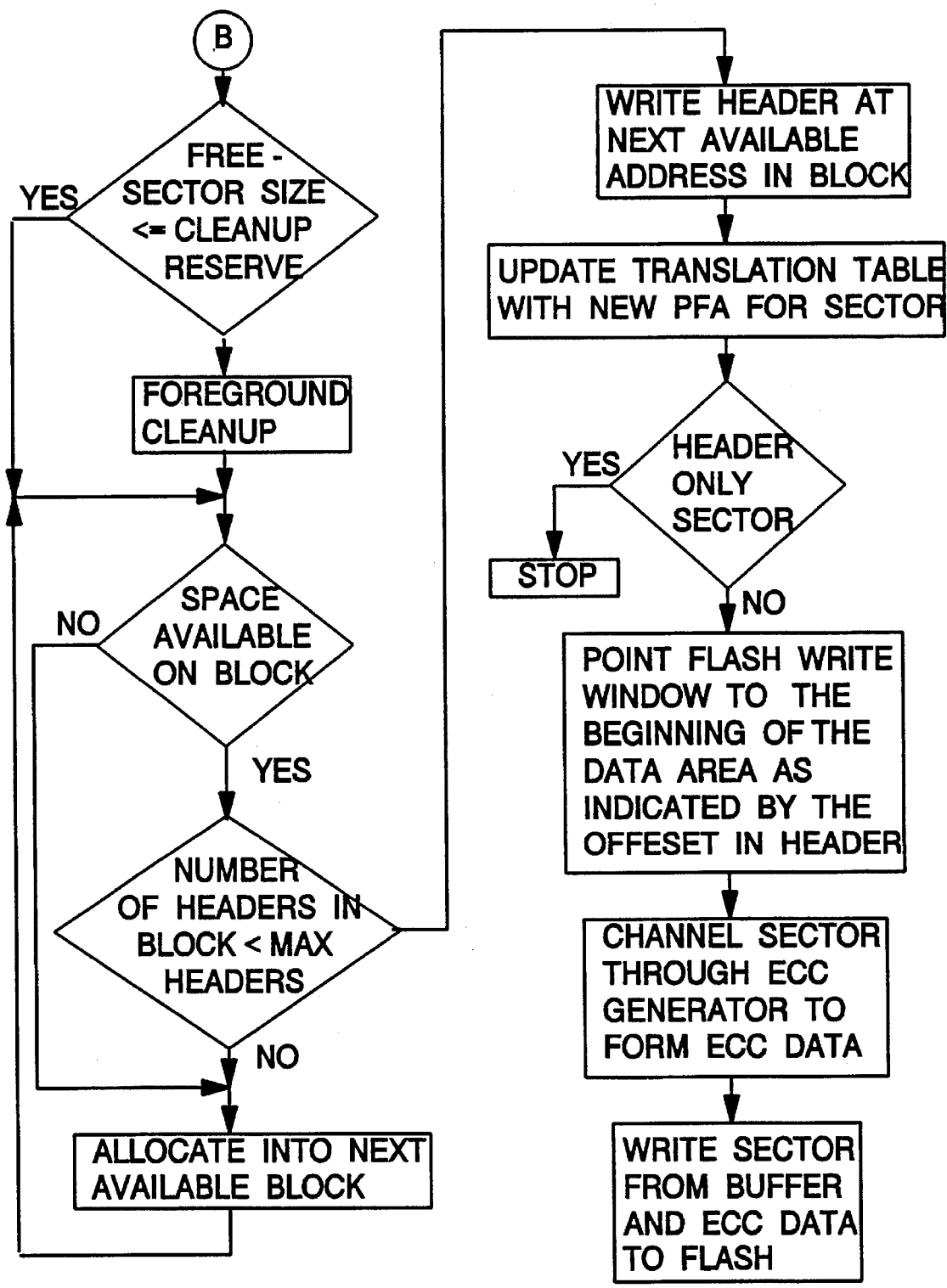

FIGS. 3A–3C describe the flash solid state drive operation for a write operation. The host issues a write instruction, the CHS address and a sector count of the number of sectors to be written. Again, the drive will translate the CHS address into a LSN. The LSN is then tested to see if the LSN is a valid LSN and, if not, sends an ID not found status to the host. The drive contains a register which has a bit assigned to it for indicating whether the data is to be compressed during a write instruction or has been compressed for a read instruction. The host processor can set this bit for a write operation and the drive sets the bit during a read operation. If the compression bit is not asserted, the 512 bytes are routed through interface control 19, selector 18, FIFO 14 and data multiplexer 12 into buffer 11. No CRC data is generated for this sector since it was not passed through compressor 20.

Whenever a sector is written into the flash memory, a new header is written for that sector. Therefore the compression bit in the attribute word of the sector header is set to indicate the sector data is uncompressed. If the compression bit is asserted, the incoming sector data is routed through interface control 19 to compressor 20 and CRC generator 22. Compressor 20 is a LEMPEL/ZIV data compressor. The compressor operates on 512 byte sectors and achieves an average compression ratio of approximately 1.6 to 1. The uncompressed data is passed through CRC generator 22 to form one byte of CRC data which is appended to the compressed data bytes from compressor 20. After compression is completed by compressor 20, a test is made as to the number bytes generated by the compression operation. In some circumstances it is possible for the number of compressed data bytes to be greater than the 512 bytes of original data. If the number of compressed bytes is equal to or less than 512 bytes, the drive will route the compressed data and the appended CRC byte through selector 18, FIFO 14, data multiplexer 12 into buffer 11. Buffer 11 is segmented and has allocated areas for storing data received for storage in the flash memory or for storing data to be sent to the host and for storing background data.

If the compression results in greater than 512 bytes of compressed data, the drive will re-route the compressed data from buffer 11 through data multiplexer 12, FIFO 14 and selector 18 to decompressor 24 such that the data is decompressed back to its original 512 bytes and stored in RAM 31. The sector data is then routed as uncompressed data from RAM 31 through selector 18, FIFO 14, data multiplexer 12 into buffer 11.

If the compression results in an unsuccessful compression, the compression bit in the attribute word is set to indicate uncompressed. If the compression resulted in a successful compression, the compression bit in the attribute word is set to indicate compression.

Since a new sector header is written for each writing of a sector and a sector header always exists within the flash memory for each logical sector number, the active or old sector header in the flash memory must be marked as invalid or dirty. In a similar fashion to the read operation, the last header associated with the sector marked dirty from the last write operation has been saved by the drive. The drive uses that header address as a pointer to the address for the next sector header in the flash array following the sector that was marked dirty during the last write operation. The drive reads the sector header and determines if the LSN in that header equals the LSN associated with the CHS address issued by the host. If the LSNs are the same, the drive will mark that header as dirty or invalid. A header is marked dirty or invalid by making the LSN stored in the header equal to 0000 which is an illegal LSN. If the LSN being sought is not equal to the LSN stored in the header, the drive reads the sector translation table to obtain a PFA for the LSN, in a similar fashion as was done for the read operation. Again, the PFA is tested as to whether it is valid or not and, if it is valid, the scan count is appended to the PFA to form the complete FA. Again, the scan count is set to zero and the drive then goes through the same loop of three steps, that is testing if the scan count is equal to 8, comparing the LSN being sought against the LSN in the header at the flash address and, finally, to add 1 to the scan count. If a match of the LSNs is found, the header at that FA is marked dirty.

If the PFA was invalid or the scan count reached a count of 8 indicating that the FA was invalid, the drive will ignore this situation and proceed with the write operation. This condition can be ignored because if the same LSN was issued during a read instruction, the read instruction would find the same invalid addresses and would return an ID not found status to the host. Further, since the write operation generates a new header which will update the sector translation table, there is no adverse affect by not finding the previous header for the LSN.

At this time either the old header has been marked invalid or the old header has not been found, the drive will next make a calculation of the amount of space available on the flash array for storing data. The drive maintains a register indicating the amount of free sectors and the amount of dirty sectors. The drive adds the number of free sectors to the number of dirty sectors and subtracts the number of sectors to be written during this write operation. The results is compared against a flash reserve set by the drive which is the number of sectors that have been reserved by the drive which are not available for writing data into. If the result is greater than the flash reserve, then standby status is sent to the host, indicating that the write operation cannot be performed.

If the result is equal to or less than the flash reserve, the drive performs the next test by subtracting the sector size from the number of free sectors and comparing the results with the cleanup reserve. The clean-up reserve is an amount of sectors that are predetermined by the drive as necessary to perform clean-up operations. If the result is greater than the clean-up reserve, the drive goes into a foreground clean-up operation. Each of the flash chips contains one megabyte of data and the block area that can be erased is 64 kilobytes of data. Therefore each block of data may contain a plurality of sectors stored within the block. The drive then reviews each block on each chip pair within the flash memory to determine if any block contains only dirty sectors. If such a block is found, that block is erased making that block available as free space.

In some situations the drive will find that a large proportion of a block is dirty and a small portion of the block has stored sector data. The drive will then go into a mode where it will read those sectors into the buffer and then restore those sectors into the clean-up reserve area, thereby allowing the block to then be erased and provide more free space in the array. The reading and writing during a clean-up operation follows the same procedure as the reading and writing of read/write command from the host.

The drive will next check the block to which it last read a header during the write operation to determine whether that block has space available for writing the present sector. If space is not available, the drive will move to the next block on the chip and determine if space is available on that block. Once a block is found with space available for writing the sector, a test is performed to determine if addition of this header would surpass the maximum number of headers allowed for a block. If the maximum number of headers would be surpassed, the drive will move on to the next block until a block is found that has both space available and room for another header.

Once an available block has been located, the header for the new sector is written at the next available address in the block. At this time the drive will write the flash address less the three low order bits into the sector translation table as the PFA for the LSN.

The drive will then check the attribute word for the new header to determine whether there is any data to be actually stored for the sector. If no data is to be written, the write operation is completed. If there is data to be written, the drive will point the write circuitry on the proper flash chip pair to the address to begin writing the sector data. As previously discussed in the read operation, data is written with the first data word being written at the offset flash addresses and all subsequent data words written at incremented addresses until all the data words have been written into the flash memory. Again data is written in a form of data words where data words contains two bytes of data. Effectively, all even bytes of data are stored in one flash chip and all odd bytes of data for the sector are stored in the other flash chip. During an erase operation of a block, a block in both of the flash chips will be erased.

The drive is now ready for the actual writing of data into the flash memory. The sector data stored in buffer 11 is first routed through multiplexer 12 to microprocessor 30 and to ECC generator 26. ECC generator generates 4 bytes of ECC data which is appended to the end of the sector data to be stored. Microprocessor 30 receives the byte by byte data from buffer 11 and provides data words to flash controller 21 such that flash controller 21 may write 16 bits in parallel into the flash memory. Microprocessor 30 will provide data words until all the data words for the sector data, the CRC data, if any, and the ECC data have been read into the flash memory.

During a write operation the sectors associated with a write command are attempted to be written sequentially into the flash array. However, this is not a requirement as the flash solid state drive maintains the location of each sector's location within the drive. Further, during a foreground operation, sectors may be moved from their original positions to other positions within the memory thereby destroying the sequentiality of location from which the sectors were originally written in the flash memory. However, the location of each sector is updated in the sector translation table whenever a sector is written, either in response to a write command from the host or during a foreground clean-up operation.

When power is brought up to the flash solid state drive, the sector translation table must be recreated from the header information stored in the flash memory. ROM 28 is composed of flash chips and, therefore, is capable of being written into. A table of bad blocks is stored in ROM 28. Seldom does a block within the flash array go bad and, therefore, the time necessary to write this data into ROM 28 is not prohibitive. A block is deemed bad if two or more unrecoverable errors have been detected during a read operation from two or more unique locations in that block.

Figure 4A:
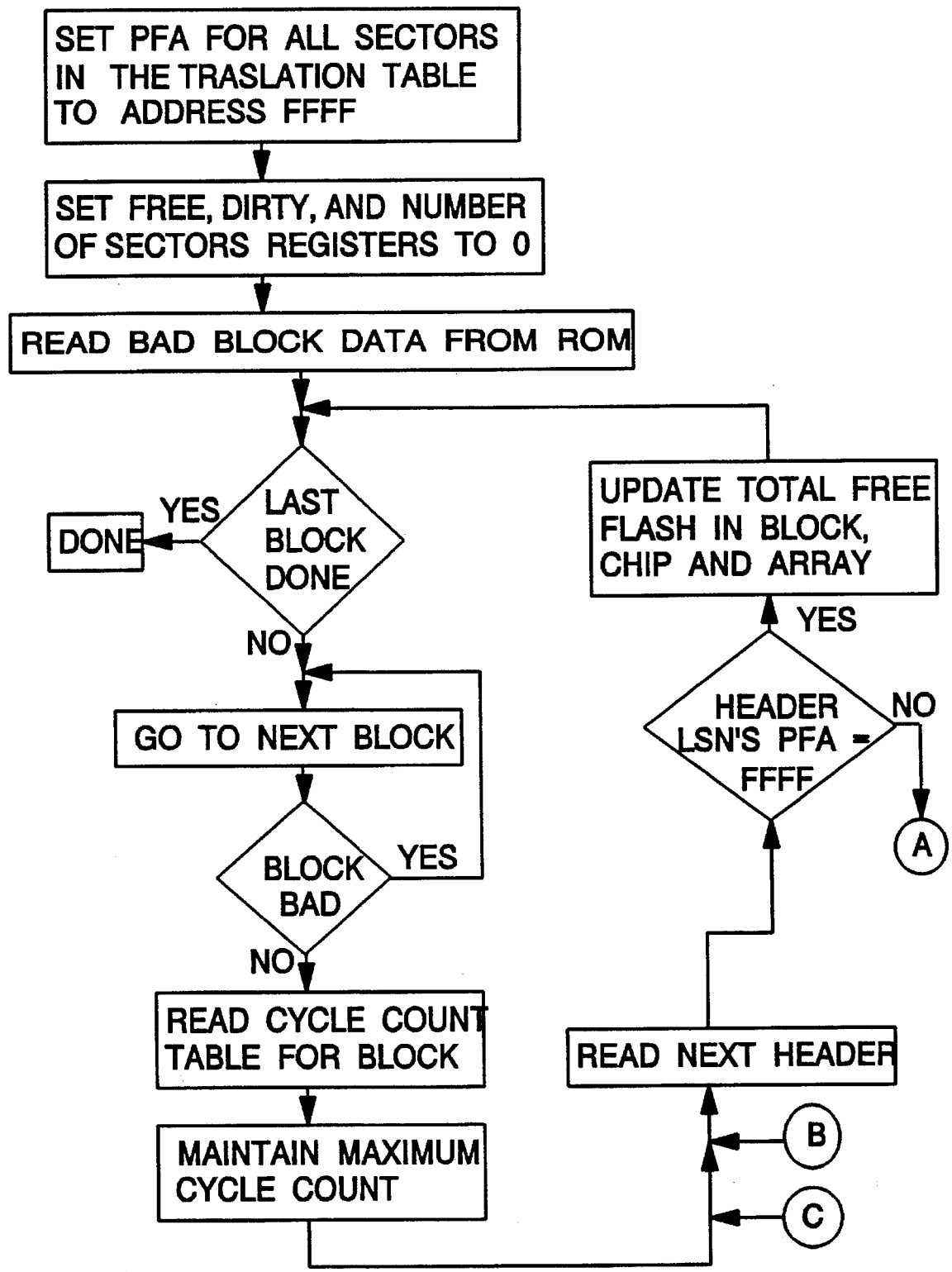
FIGS. 4A and 4B is a flow chart setting forth the operation of the flash solid state drive to initialize the sector translation table during the power up sequence.
Figure 4B:
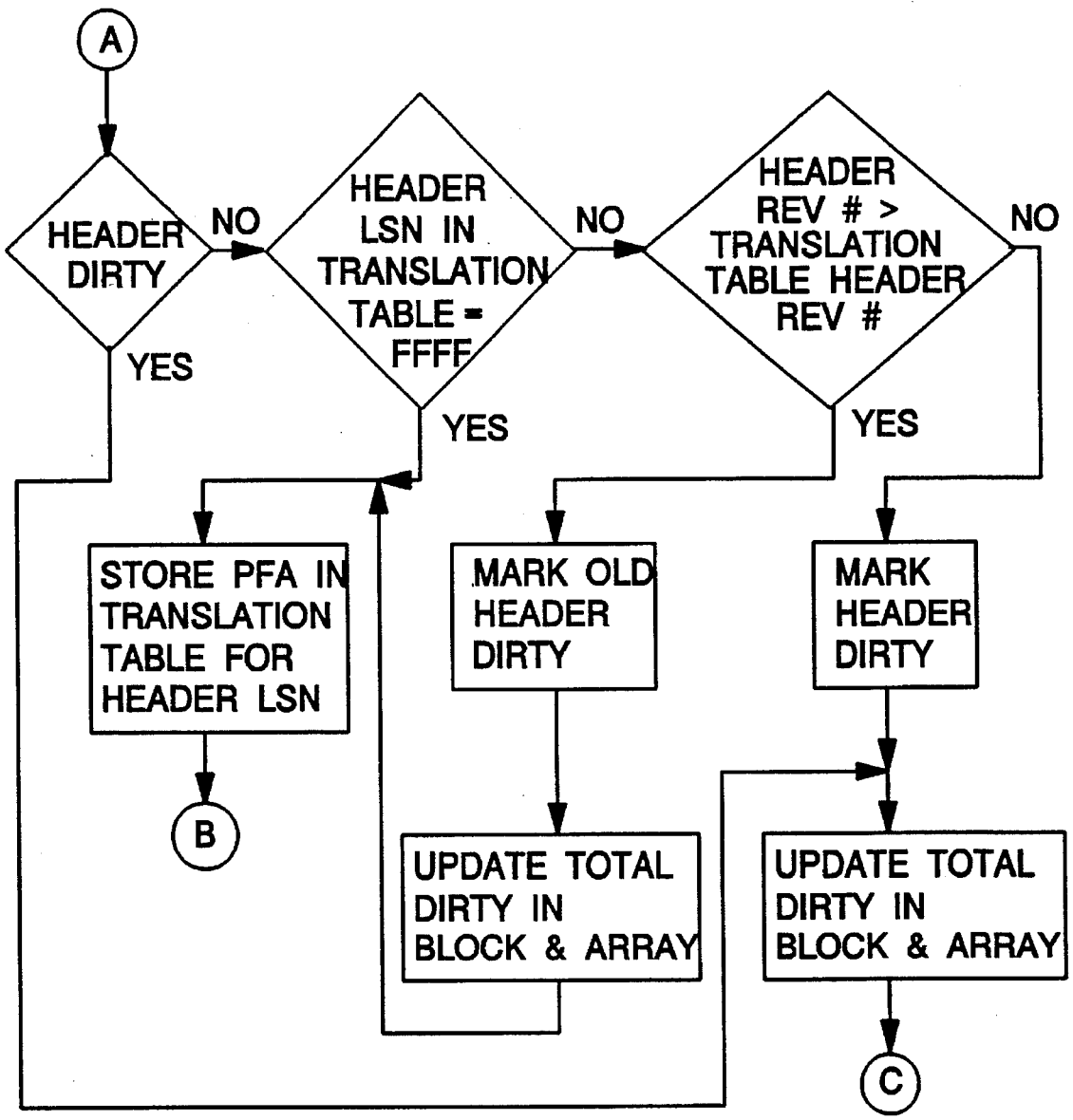

FIGS. 4A and 4B show the procedure enacted by the flash solid state drive to reconstruct the sector translation table during the power-up sequence. First, the PFA for each LSN is set to the illegal address of FFFF. Next, the registers containing the number of free sectors, dirty sectors and total number of sectors are reset to zero. Finally, the bad block data is read from ROM 28 and stored in RAM 29.

A test is done to establish if the last block in the flash array has been processed. If the last block has been processed, the initiation procedure is done. If the last block has not been processed, the drive will go to the next block in the flash array. In the beginning, the drive will go to the first block in the first chip pair and sequentially go through the blocks on a given chip pair and then through all chip pairs until all blocks on all chip pairs have been processed. When arriving at a block, the block table is checked to determine if the block is bad. If the block is bad, the block is not processed and the drive will go to the next block. Arriving at a good block the drive will read from the block the cycle count for that block.

Each block has stored within a designated area in the block a cycle count indicating the number of times the block has been erased. The cycle count is read and noted by the drive for that block of memory. The cycle count for the block being processed is compared with the maximum cycle count presently stored in the maximum cycle counter register. If the cycle count for this block is greater than the maximum cycle count in the register, the cycle count for this block is stored and becomes the maximum cycle count. The maximum and individual cycle counts are used by the drive in determining the wear profile of the flash memory. Since flash chips have a lifetime defined by the number of times the blocks on the chip are erased, it is desirable to attempt to maintain the cycle count across the flash memory as evenly as possible such that the flash chips in the flash memory age at the same rate. The drive can use the knowledge of the maximum cycle count and the cycle count for a given block in determining whether or not that block should be erased during a clean-up process as described for the write operation. By not erasing the block, the block will remain in its present erase age until other portions of the flash memory obtain approximately the same age.

Once arriving at a block the process will read the next header in the block. The header first read will be the first header in each block as that block is processed. The header LSN is read and that LSN's location is read from the sector translation table to determine if that LSN's PFA is equal to the invalid address of FFFF. A header is maintained by the drive at the end of the space allocated for header data to be written into the flash memory. This last header for has a LSN equal to FFFF. Therefore, after the header is read, the header LSN is checked for the value of FFFF and, if the condition is met, the drive knows that all headers have been processed. If the header LSN is not equal to FFFF then the drive will go on and process the header in that block.

Next, the header for the sector is checked to see if the sector is dirty, that is, does the sector contain valid data. The sector is noted to be dirty by having a LSN equal to 0000. If the sector is dirty, the dirty block register and dirty array register are updated and the drive will read the next header. If the header is not dirty, the drive will read the logical sector number in the header and then reference that LSN in the sector translation table to determine if the PFA associated with that LSN is FFFF. If the PFA is not FFFF, the drive knows that it had processed the same LSN prior to processing this header.

The header attribute word has a field which indicates the revision number which is generated by the drive whenever a LSN is written such that the highest revision number represent the LSN having the most recent and therefore valid data for that LSN. The drive will read the header for the PFA in the sector translation table for the LSN. The drive then compares the revision number in the retrieved or old header for that LSN with the revision number for the presently being processed LSN. If the presently processed header's revision number is greater than the old header's revision number, the old header's is marked dirty by making a old header's LSN equal to 0000. The drive will then update the dirty block register and dirty array register. Next, the drive will modify the sector translation table to reflect the PFA of the header presently being processed for the LSN stored the header presently being processed. The drive will then go on to process the next header.

If the header revision number for the presently processed sector is less than the revision number in the old header, then the presently processed header's LSN is marked dirty by making the LSN equal to 0000. In practice this occasion should not arise because low revision sectors should have been marked dirty when the latest revision was written. This process is done to make sure that the PFA associated with a LSN contains the most recent data that was stored in the flash memory for that LSN. Once again the total dirty block register and array register are updated and the drive then proceeds to the next header for processing.

When the last header has been processed in that block, the drive will update the total amount of free flash in the block, chip and array registers. When the last block has been processed, the sector translation table has been rebuilt and the total amount of free flash for each block, chip and the memory is stored in a free flash block registers, free flash chip registers and a free flash memory register. At the end of the initialization the drive will therefore have reconstructed the sector translation table and will know the free flash available for processing on each chip, for each block on each chip and for the total memory.

The foregoing description of the system architecture and the system operation would allow a drive designer, skilled in the art, to construct the flash solid state drive and to write an operating system for operating that constructed flash solid state drive in the manner as heretofore set forth above. It is understood that the designer of the operating system may wish to vary the steps in the procedure as set forth in the discussion of the operation of the system. Further, the designer may wish to design the system architecture to take advantages of the specification which the designer is setting for his own flash solid state drive. Such variations that could be to include would be where the operating system stored in ROM performs the procedures that are carried out by the state machines or where additional state machines carry out other portions of the operating system that where stored in ROM.

From the foregoing discussion a flash solid state drive has been described which emulates a magnetic disk drive. Specifically, the drive described emulates a 40 megabyte magnetic disk drive. The flash memory array will store 30 megabytes of compressed data which is equivalent to approximately 45 megabytes of uncompressed data. The flash drive described employs various length sectors for enhancing data storage, the simultaneous reading and writing of two bytes of information into and out of the flash memory to increase the speed of the flash solid state drive and the dynamic storage of sectors in the flash array in accordance with availability of within the flash memory.

The flash solid state drive is transparent to the host and can be used directly in place of a magnetic disk drive having the same storage capacity, or less. Further, the flash array may be altered in size to contain more or less flash chips, thereby increasing or decreasing the capacity of long term memory within the flash solid state drive. The described flash solid state drive is plug compatible with the magnetic disk drive which it emulates and does not require any reprogramming of the host system employing the flash solid state drive.

AT INTERFACE ARCHITECTURE STATE MACHINES

Figure 5:
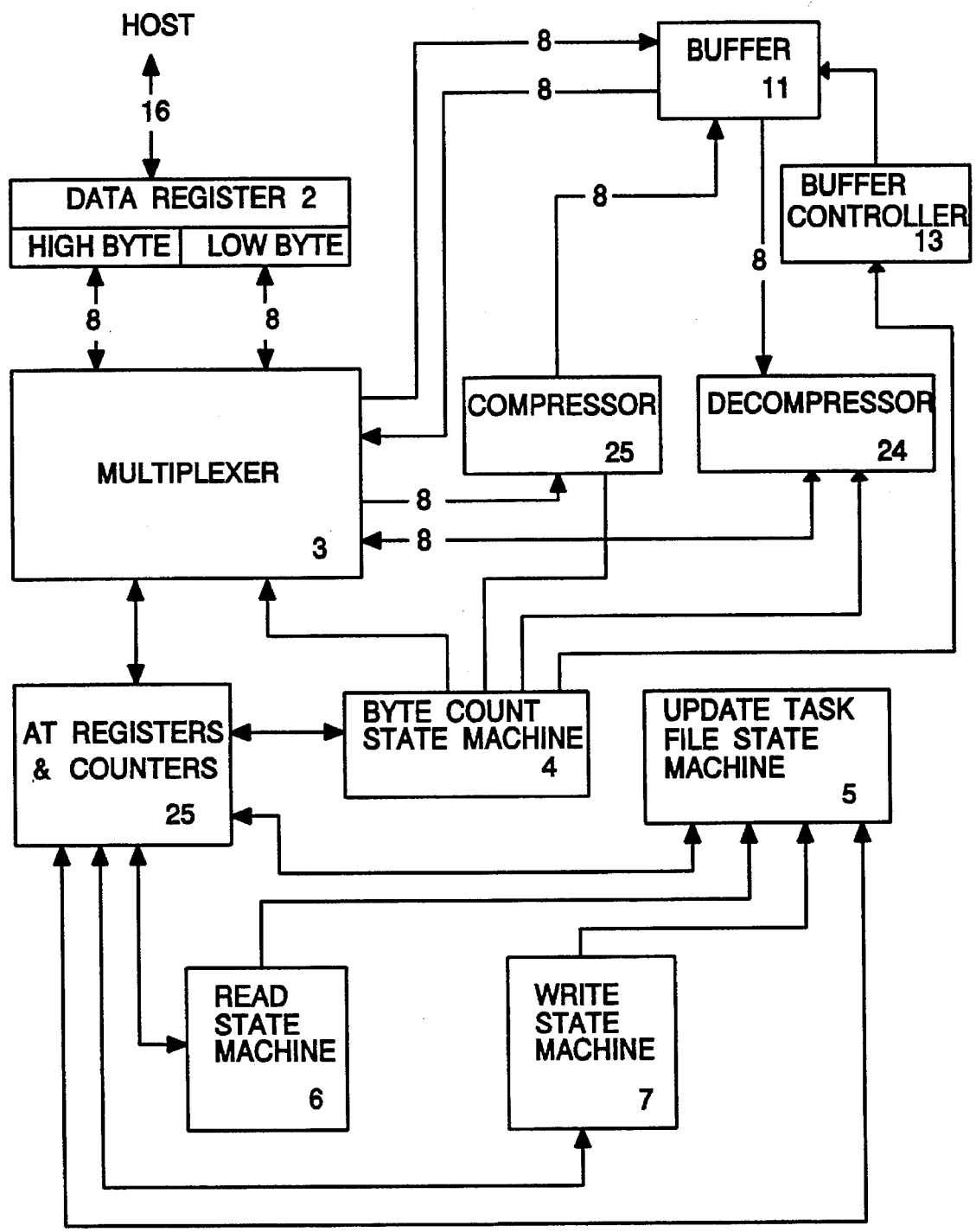
FIG. 5 is an overall logic diagram of the major components of the ATA interface including the four state machines.

FIG. 5 is an overview of the major components of the AT architecture involved in the transfer of data to and from the host. In the WRITE command the host places a data word, two bytes, into data register 2, then the data word is transfer as two bytes of data via multiplexer 3 either directly to the buffer 11 if their is to be no compression or to compressor 25 and then to buffer 11 if their is to be compression. In the READ command, two bytes of data will be transferred from buffer 11 via multiplexer 3 to data register 2 then to the host as a data word if the sector being read was not compressed or data will be transferred from buffer 11 to decompressor 24 and then two bytes will be sequentially transferred from decompressor 24 via multiplexer 3 to data register 2 and then a data word will be transferred to the host if the sector was compressed.

AT registers 25 can be accessed by the host, the microprocessor and the state machines and contains the information for controlling the transfer of data during a READ or WRITE operation. Byte Count State Machine 4 controls the transfer of a sector of data between data register 2 and buffer 11, compressor 25 and decompressor 24. Update Task File State Machine 5 determines when all sectors have been transferred and will cause the sector address to be incremented if another sector is to be transferred. Read State Machine 6 controls all READ commands. Write State Machine 7 controls all WRITE commands.

UPDATE TASK FILE STATE MACHINE

The purpose of the Update Task File State Machine is to increment the cylinder head and sector values of the sector address, and to decrement the sector counter upon a request from either the Read State Machine or the Write State Machine.

STRUCTURE

Figure 11:
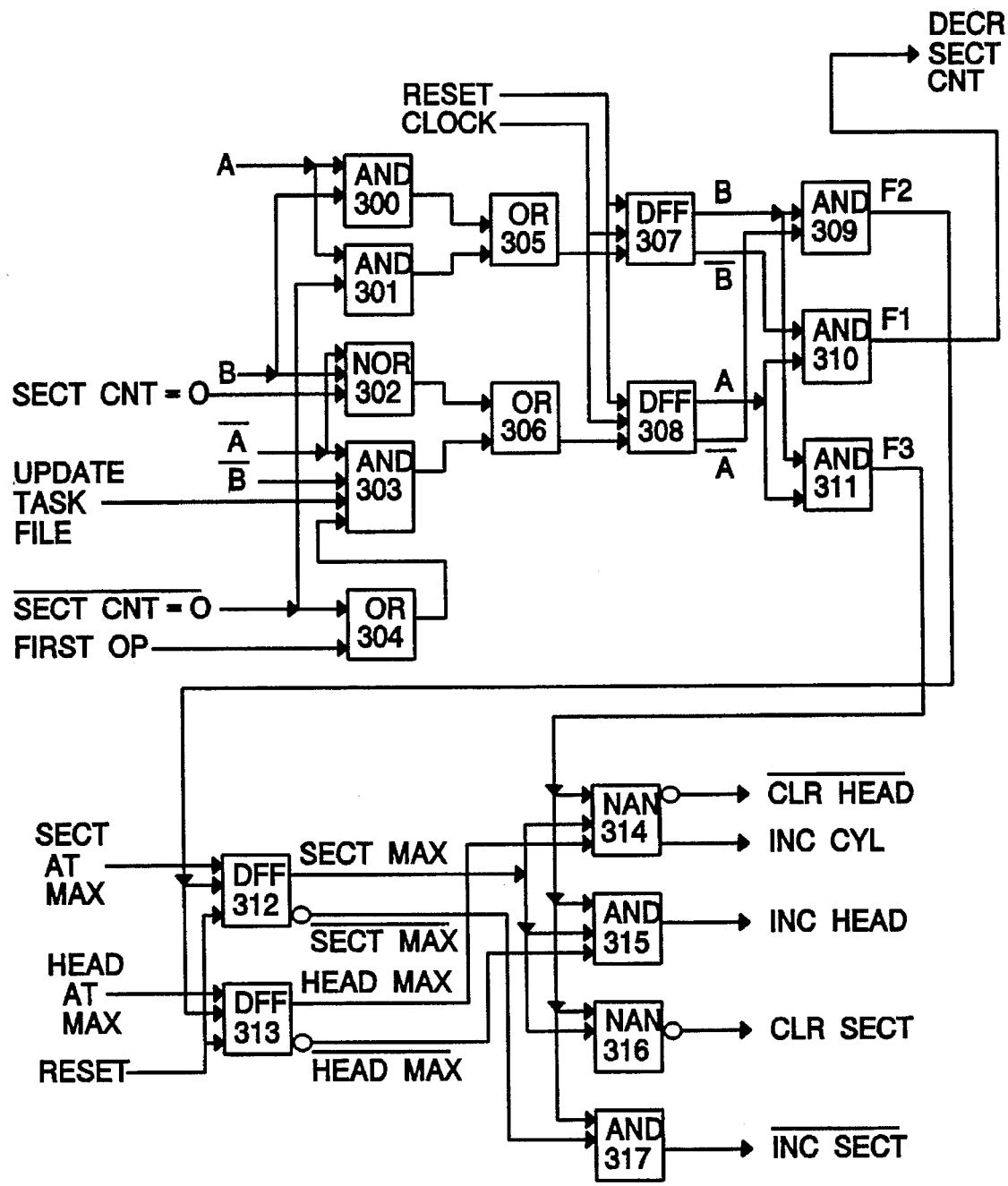
FIG. 11 is a logic diagram of the Update Task File State Machine.

FIG. 11 is a logic diagram of Update Task File State Machine 5. FFs 307 and 308 form a two bit register storing the present state of the state machine where FF 308 is the low bit. ANDs 309, 310 and 311 decode the count in FFs 307 and 308. AND's 309 output F2 will be high during state 2 of the state machine, AND's 310 output F1 will be high during state 1 of the state machine and AND's 311 output F3 will be high during state 3 of the state machine. ANDS 300, 301, 303, NOR 302 and OR 304 sequence the states of the state machine as a function of the present state stored in FFs 307 and 308 and input control signals from the AT registers 25. ORs 305 and 306 output represent the next state of the state machine that will be read into FFs 307 and 308 by the next clock pulse. FFs 312 and 313, ANDs 315 and 317 and NANs 314 and 316 control the incrementing of the sector address in response to outputs F1 and F3.

OPERATION

Figure 13:
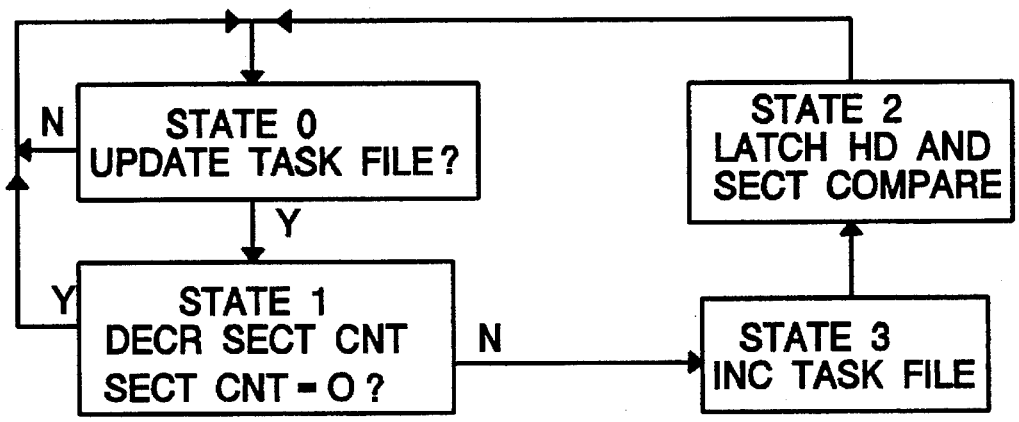
FIG. 13 is a flow chart of the operation of the Update Task File State Machine.

FIG. 13 is a flow chart of the operation of the Update Task File State Machine.

State 0

The state machine remains reset, at state 0, until it receives an update task file signal from either the Read or Write State Machine. If the sector counter is equal to zero and this is not the first operation of a read or write operation, the state machine will not respond to the update task file signal and will remain in state 0. If the sector count is not equal to zero or this is a first operation then the update task file signal will cause the state machine to switch to the next state.

State 1

In state 1, output F1 will be high which will cause the sector count to be decremented in the AT registers 25. The sector count is then tested and if equal to zero the state machine will switch to state 0 upon the next clock pulse and the cycle of the state machine is completed. If the sector count is not equal to zero then the state machine will switch to state 3 upon the next clock pulse. The fact that the sector count register is decremented first allows the read and write functions and all of their respective different ending conditions to be completed in the exact same fashion as if the microprocessor was performing the task. For example, at the end of a read operation, the task file register is to point to the last sector read during the read operation. In this case, the count register is decremented to zero at the end of the transfer and the state machine returns to state 0 rather than going into state 3, thereby saving the address of the last sector that was read. In a write operation, the task file must also point to the last sector transferred and again since the task file sector counter register is decremented first, and under these conditions will go to zero, the state machine will return to state 0 rather than to state 3, thereby maintaining the address of the last sector transferred.

State 3

When the state machine is in state 3, the output F3 of AND 311 is high which will cause the cylinder, head sector values for the next sector address to be generated as a function of the output of FFs 312 and 313. The state machine will switch to state 2 upon the next clock pulse.

State 2

When the state machine is in state 2, the output F2 of AND 309 will be high which will read into FF 312 the results of a comparison of the present sector value and the maximum sector value stored in AT registers 25 and will read into FF 313 the results of a comparison of the present head value with the maximum head value stored in the AT registers. This allow the proper sequencing of the sector addresses. The state machine will then switch to state 0 and the cycle is complete.

BYTE COUNT STATE MACHINE

The purpose of the Byte Count State Machine 4 is to control the transfer of a sector of data between the host and buffer 11. A cycle of the state machine will transfer two bytes of data, thus the state machine will have 256 cycles for the transfer of a sector of data comprising 512 bytes.

STRUCTURE

Figure 12:
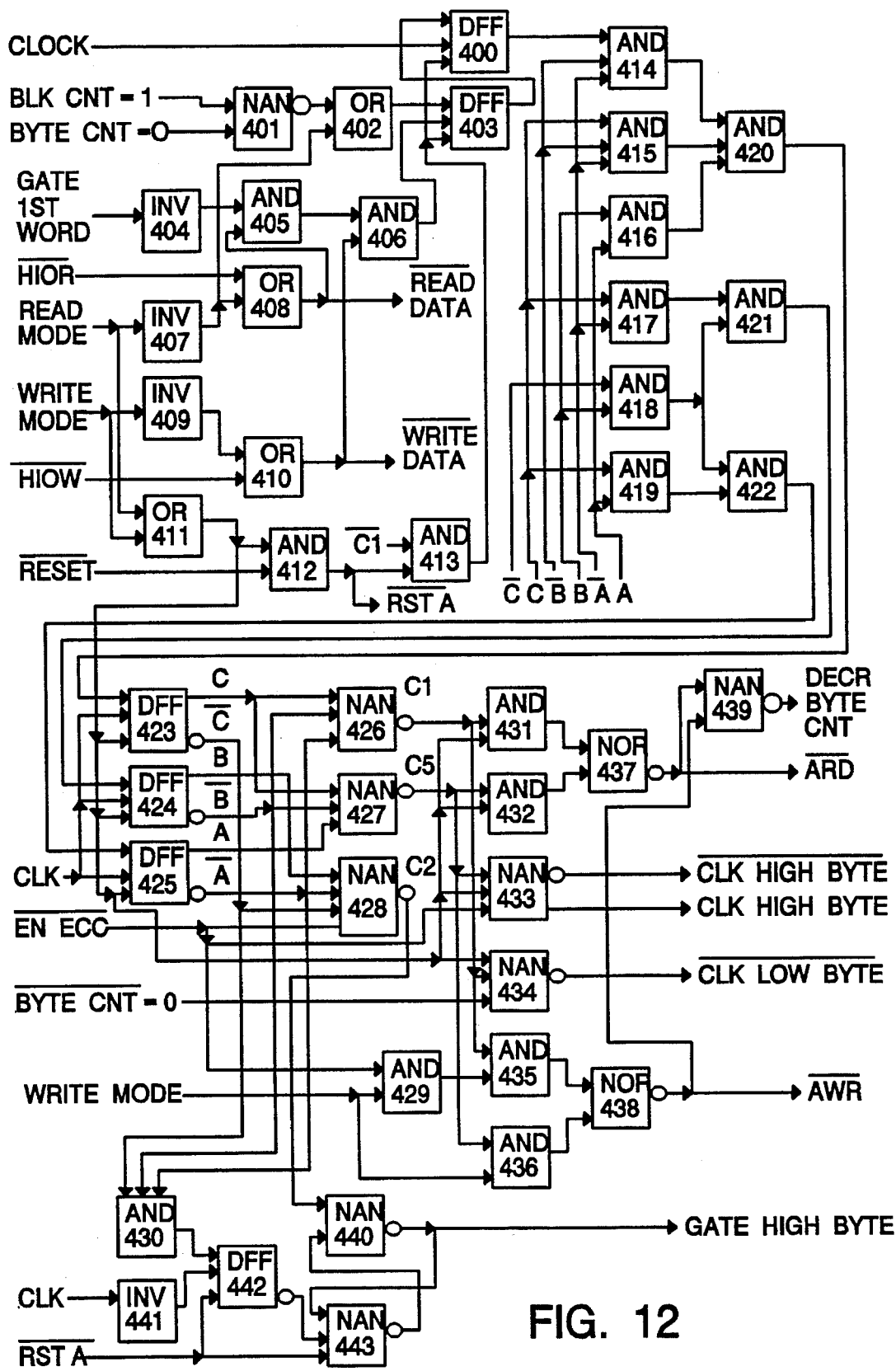
FIG. 12 is a logic diagram of the Byte Count State Machine.

FIG. 12 is the logic diagram for the Byte Count State Machine. FFs 423, 424 and 425 form a three bit register storing the present state of the state machine where FF 423 is the low bit and FF 425 is the high bit. NANs 426, 427 and 428 decode the count in FFs 423,424 and 425. NAN's 426 output C1 will be high during state 1 of the state machine, NAN's 427 output C5 will be high during state 5 of the state machine and NAN's 428 output C2 will be high during state 2 of the state machine. ANDs 414 through 419 sequence the states of the state machine as a function of the present state stored in FFs 423, 424 and 425 and control signals from the AT registers 25. The state machine once started will cycle through state 0,1,3,2,6,7,5,4 and 0 in that order. ANDs 420, 421 and 422 outputs represent the next state of the state machine that will be read into FFs 423,424 and 425 by the next clock pulse. FF 442, ANDs 430, 431, 432, 435, 436 and 429, NANs 439, 433, 434, 440 and 443, NORs 437 and 438 and INV 441 control the sequencing of data between data register 2 and buffer 11 as a function of the state of the state machine and control signals from AT registers 25. FFs 400 and 403, AND 406,413,412,and 405, ORs 402, 408, 410 and 411, INV 404,407 and 409 and NAN 401 synchronize the state machine as a function of control signals received from AT registers 25.

OPERATION

Figure 14:
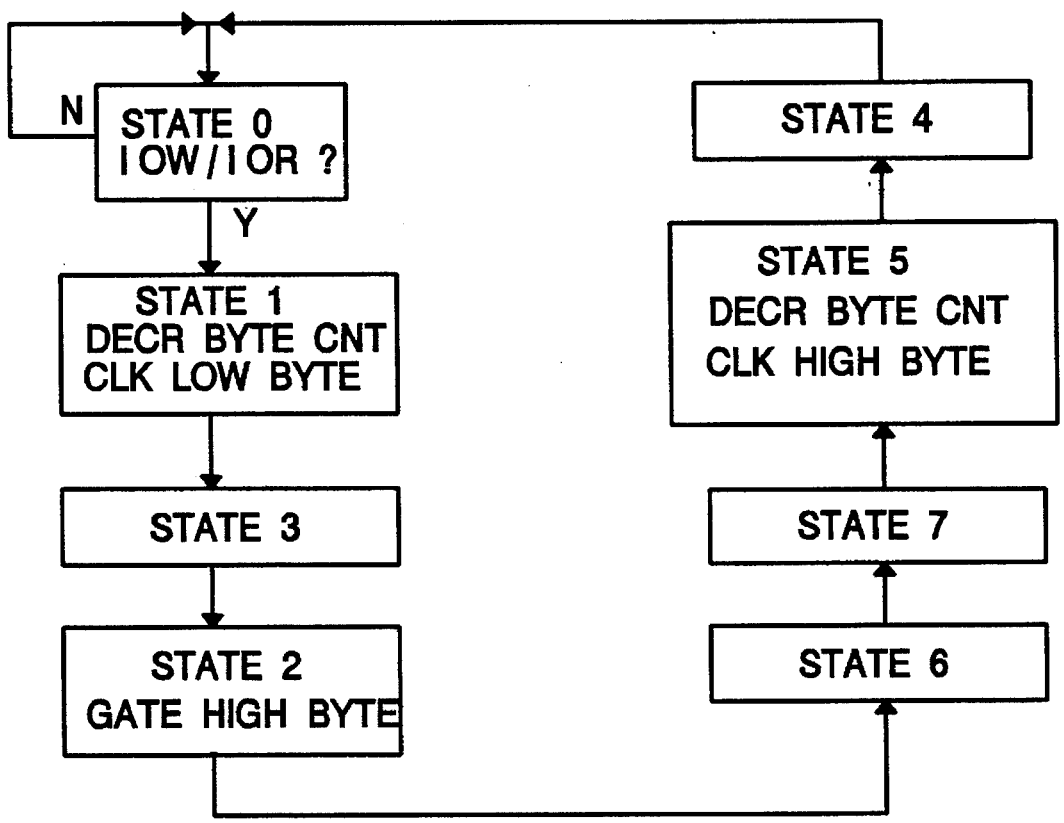
FIG. 14 is a flow chart of the operation of the Byte Count State Machine.

FIG. 14 is a flow chart of the operation of the Byte Count State Machine.

State 0

The state machine is activated by the setting of the read mode or write mode in the AT registers 25 or by the generation of a gate first word signal by the Read State Machine 6. The state machine will remain in state 0 until an IOW or an IOR signal is raised in the AT registers 25 at which time the state machine will begin one cycle of operation.

State 1

In state 1, the output of NAN 426 will be high resulting in a signal being generated to decrement the byte count register in the AT registers 25 and to generate a timing signal to transfer one byte of data from or to the low byte position in data register 2. In a WRITE command, if the data is not to be compressed, the low byte of data register 2 is transferred to directly to buffer 11 under control of buffer controller 13 which receives the clock low byte signal. In a WRITE command, if the data is to be compressed, the low byte of data register 25 is transferred to compressor 25 which receives the clock low byte signal. Further buffer controller 13 also receives the transfer low byte signal and will transfer a compressed data byte from the compressor if a compressed data byte is ready to be transferred. In a READ command, if the data is not compressed, a byte is transferred from buffer 11 to data register 2 under control of buffer controller which received the clock low byte signal. In a READ command, where the data was compressed, one byte is transferred from the buffer 11 to decompressor 24 under control of the buffer controller 13 in response to the clock low byte signal, if their are any bytes of compressed data to be transferred, and one byte is transferred from decompressor 24 in response to the clock low byte signal to the low byte of data register 2. Multiplexer 3 in response to the type of command and whether compression is to be performed as indicted by the AT registers 25 provides the required data path for the byte being transferred.

State 3

No action is taken.

State 2

In state 2, output C2 of NAN 428 will be high which will result in a gate high byte signal being generated. The gate high byte signal is detected by multiplexer 3 which will then gate the next byte to be transferred to or from the high byte od data register 2.

State 6

No action is taken.

State 7

No action is taken.

State 5

In state 5, the output of NAN 426 will be high resulting in a signal being generated to decrement the byte count register in the AT registers 25 and to generate a timing signal to transfer one byte of data from or to the low byte position in data register 2. In a WRITE command, if the data is not to be compressed, the high byte of data register 2 is transferred directly to buffer 11 under control of buffer controller 13 which receives the clock high byte signal. In a WRITE command, if the data is to be compressed, the high byte of data register 25 is transferred to compressor 25 which receives the clock high byte signal. Further buffer controller 13 also receives the transfer high byte signal and will transfer a compressed data byte from the compressor if a compressed data byte is ready to be transferred. In a READ command, if the data is not compressed, a byte is transferred from buffer 11 to data register 2 under control of buffer controller which received the clock high byte signal. In a READ command, where the data was compressed, one byte is transferred from the buffer 11 to decompressor 24 under control of the buffer controller 13 in response to the clock high byte signal, if there are any bytes of compressed data to be transferred, and one byte is transferred from decompressor 24 in response to the clock high byte signal to the high byte of data register 2. Multiplexer 3 in response to the type of command and whether compression is to be performed as indicted by the AT registers 25 provides the required data path for the byte being transferred.

State 4

No action is taken.

State 0

Same as state 0 as described above.

READ STATE MACHINE

The Read State Machine frees the microprocessor from intervention between sectors, thereby removing the between sector overhead of the data transfer caused by the storage system. The activities that are eliminated are the updating of the task file, checking to see if there is data in the buffer, and telling the drive that a sector has been transferred. This totally eliminates any host related microprocessor activity between sectors on a read operation.

STRUCTURE

Figure 6:
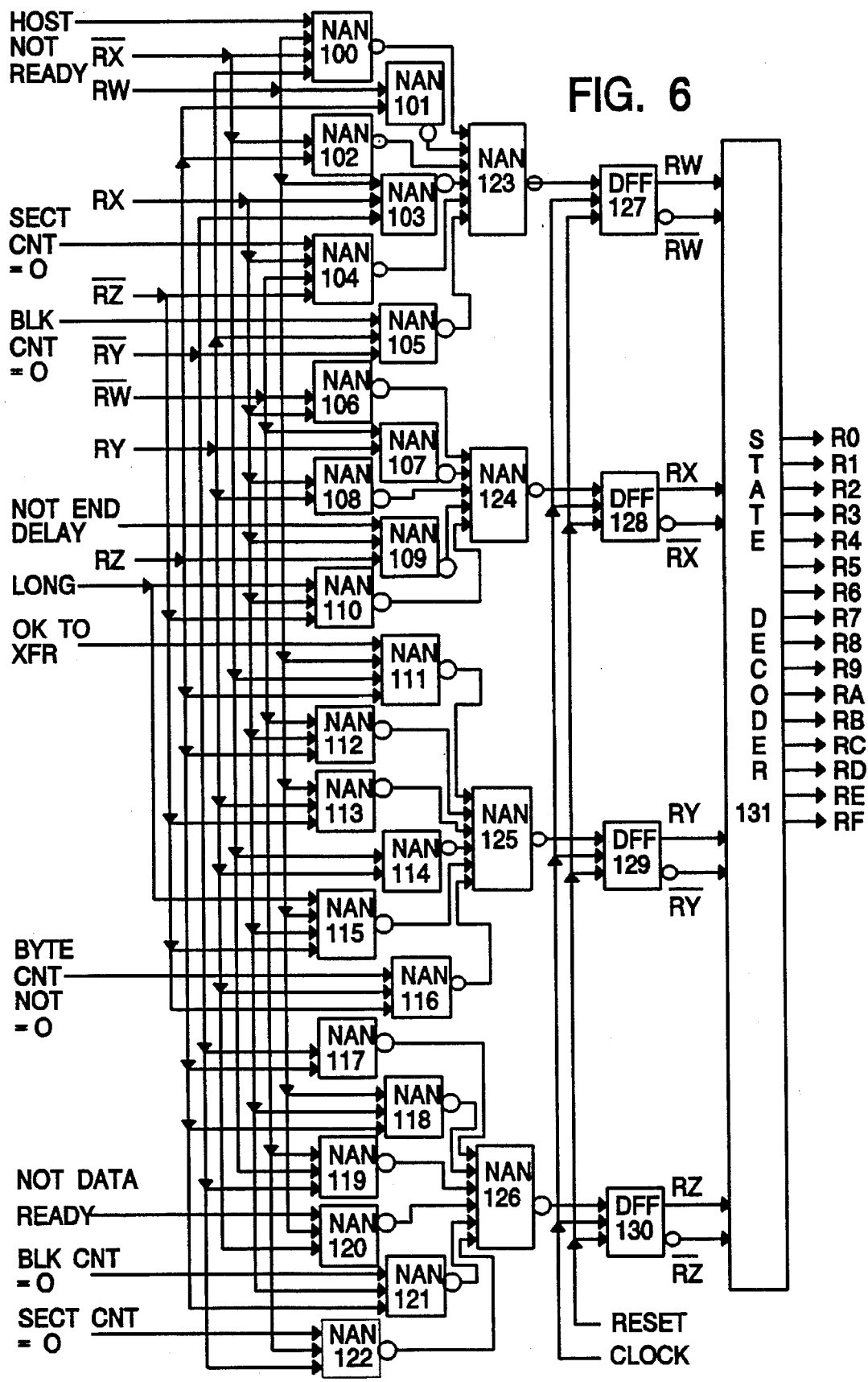
FIG. 6 is a logic diagram of the Read State Machine.
Figure 10:
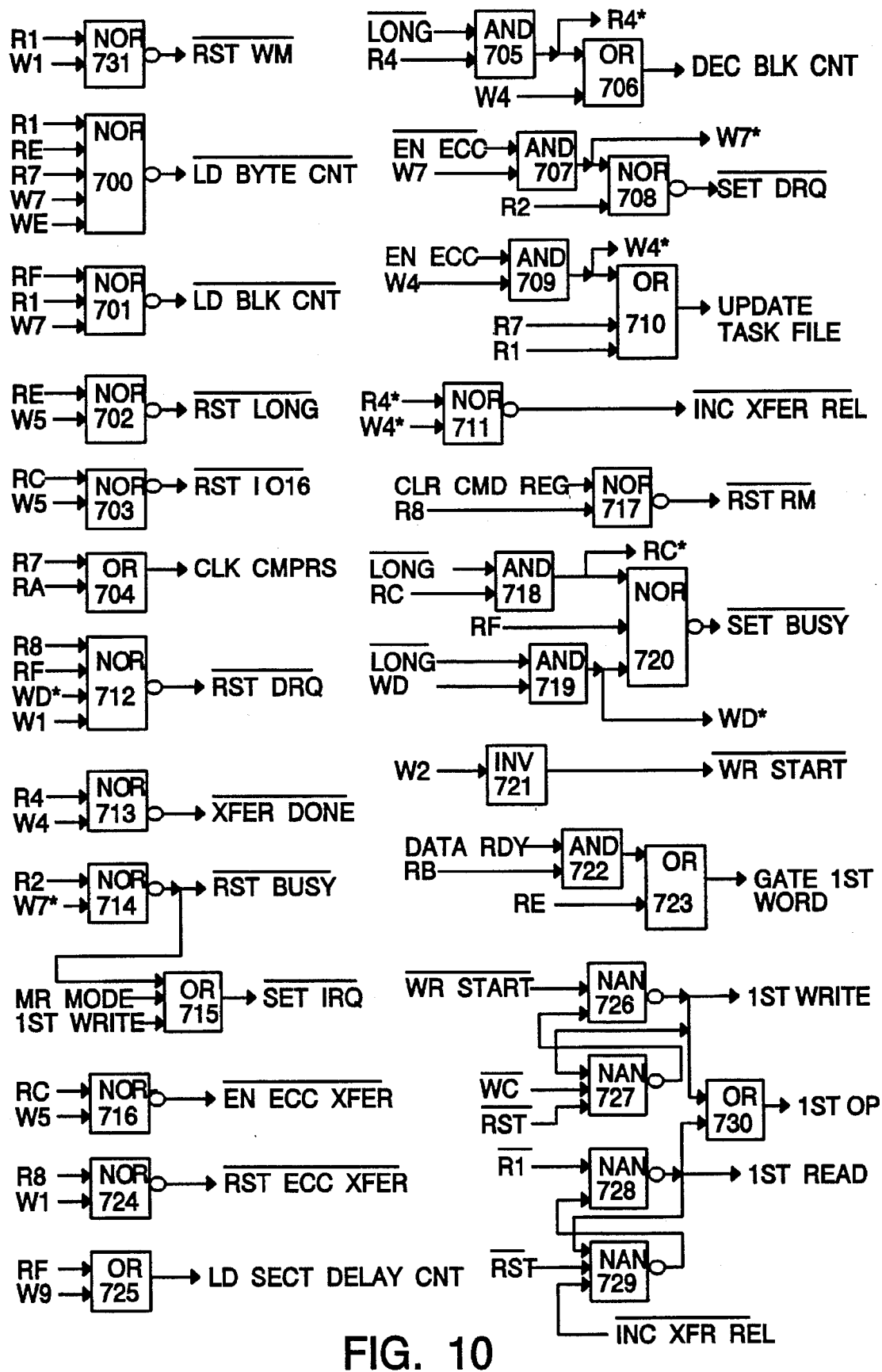
FIG. 10 is the control logic controlled by both the Read and Write State Machines for providing control signals to the storage system during a read and write operation and to the host processor during a read and write operation.

FIG. 6 is a logic diagram of the Read State Machine 6 and FIG. 10 is a logic diagram of the control circuitry controlled by the Read State Machine 6. FFs 127, 128, 129 and 130 form a four bit register storing the present state of the state machine where FF 130 is the low bit and FF 127 is the high bit. State decoder 131 decodes the count in FFs 127, 128, 129 and 130 and provided sixteen signals R0 to RF corresponding to the sixteen states 0 to F where the signals will be present when the state machine is in the corresponding state. NANS 100 through 126 sequence the states of the state machine as a function of the present state stored in FFs 127, 128, 129 and 130 and control signals from the AT registers 25. NANs' 123, 124, 125 and 126 outputs represent the state of the state machine that will be read into FFs 127, 128, 129 and 130 by the next clock pulse. NORs 700–703, 711–714, 716, 717, 720, 724 and 731, ORs 706, 710, 715, 723, 725 and 730, ANDs 705, 718 and 722 and NANs 727–729 of FIG. 10 generates the various control signal for the processing of the READ commands as a function of the state of state machine as provided by output signal R0 through RF and control signals from the AT register 25.

OPERATION

Figure 7:
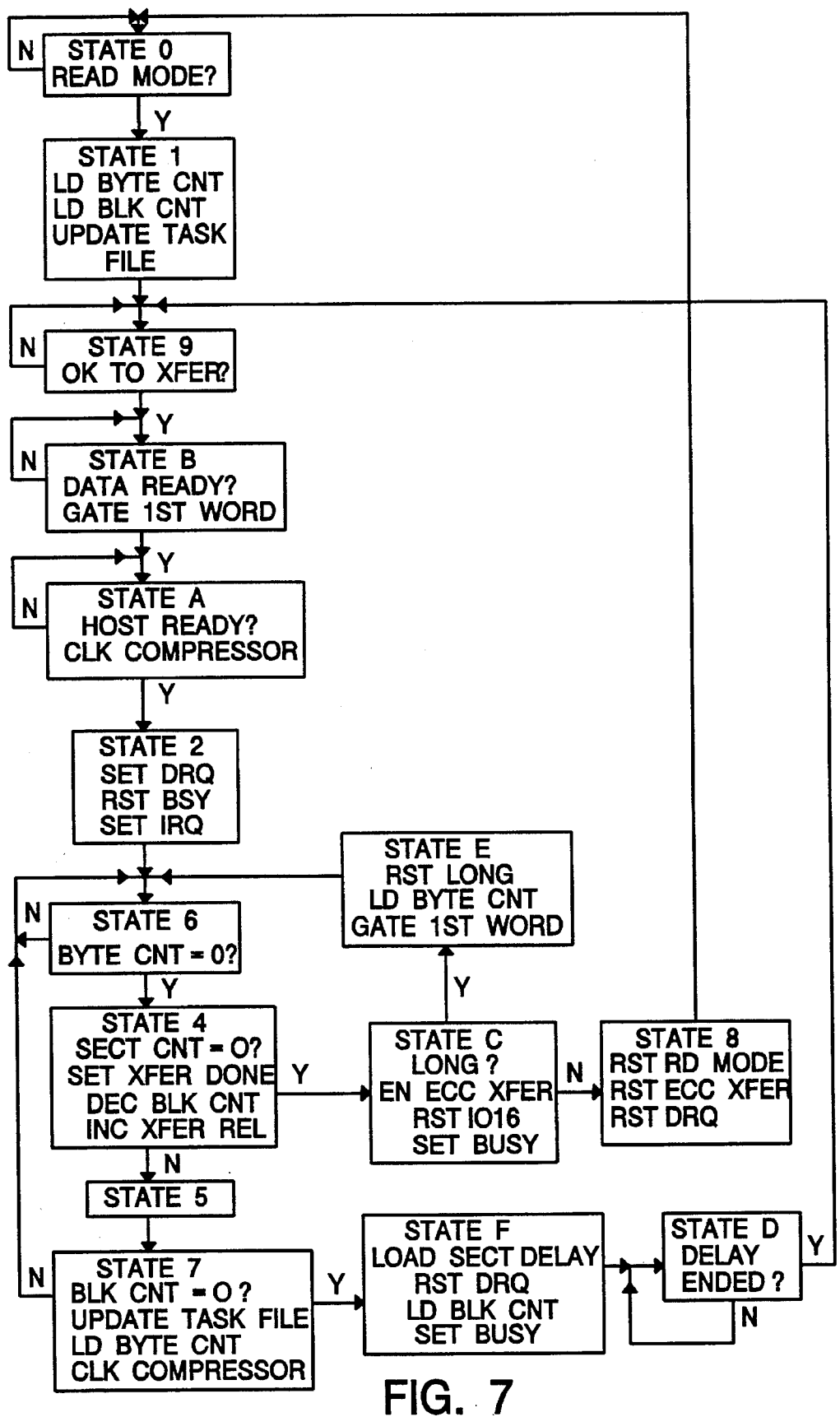
FIG. 7 is a flow chart of the operation of the Read State Machine.

The operation of the Read State Machine 6 will be described with reference to the flow chart of FIG. 7.

State 0

The Read State Machine 6 is in a sleep condition in this state until the read mode is set in the AT register 25 which causes the state machine to be switched to state 1.

State 1

In state 1, the read initiation takes place. When in state 1 the byte count and block count will be loaded in the AT registers 25, the update task file state machine 5 will initiate a cycle of operation and a first read signal and a first operation signal will be generated. The state machine will be switched to state 9 by the occurrence of the next sector pulse.

State 9

The state machine will stay in state 9 until the OK-to-transfer condition is indicated by the AT registers 25. The OK-to-transfer signal indicates that there is data in the buffer and that the decompressor 24 is ready and active. For multiple reads, data in the buffer means that there is one block worth of sectors in buffer 11. For all other reads, data in the buffer means that there is one sector in the buffer. When the microprocessor has finished putting a sector in the buffer, it increments the sector available register in the AT registers 25 which is used by the state machine to tell if data is in the buffer by raising the OK-to-transfer signal. After the OK-to-transfer signal has been raised the next clock pulse will place the state machine in state B.

State B

The state machine will remain in state B until the decompressor 24 or the buffer controller 13 indicates that data is ready to be transferred by raising data ready in AT register 25. After the data ready signal has been generated and before the next clock pulse, a gate first word signal will be generated to the byte counter state machine 4. This signal will cause the byte count state machine to cycle through one operation, providing the first two bytes of the sector to be loaded in the data register to be transferred to the host. At the next clock pulse, the state machine will switch to state A.

State A

The state machine remains in state A until the host is ready for the transfer of data as indicated by the host processor by setting the proper bit in the AT registers 25. State A will generate a clock compression bit signal which will cause the multiplexer 3 to route data to the data register 2 from the decompressor 24 if the compression bit is turned on or from the buffer 11 if the compression bit is turned off. The results will be the issuing of a host ready signal resulting in the state machine switching to state 2 upon the issuance of the next clock pulse.

State 2

The state decoder 131 will generate signal R2 which will reset busy, set IRQ, and set DRQ. The resetting of busy and the setting of the DRQ and IRQ starts the transfer of data between the storage system and the host. At the next clock pulse, the state machine will switch from state A to state 6.

State 6

The Read State Machine 6 will stay in state 6 until the byte counter goes to zero. The byte counter is controlled by the Byte Count State Machine and the byte counter going to zero indicates that a sector has been transferred. When the byte count equals zero has been raised in the AT registers 25, the state machine will be switched to state 4 by the next clock pulse.

State 4

State decoder 131 will provide signal R4 to the control logic which in turn will cause the transfer done bit to be set in the AT registers 25 and will decrement, if not a READ LONG command, the sectors available register and the block count register in the AT registers 25. IF the sector count is equal to zero then the state machine will be switched to state C and if the sector count is not equal to zero (only in a MULTIPLE READ command) the state machine will be switched to state 5.

State C

State decoder will provide signal C which will, in the AT registers, set the enables ECC transfer bit and resets IO16 bit, which is required during normal transfer when the host is transferring data words but is not required when the ECC bytes are transferred during a read long command. Further the busy bit in the AT registers will be reset if the read command is a READ LONG command. If the read command was a READ LONG command then the long bit in the AT registers 25 will be set and the state machine will switch to state E otherwise the state machine will switch to state 8.

State E

State E is entered where the ECC bytes are to be transferred to the host. State E will reset the long bit, load the byte count, which in this case will be from the ECC size register, and will issue a gate first word signal to the Byte Count State Machine to initiate operation of the Byte Count State Machine. At this time the Byte Count State Machine will transfer the ECC bytes to the host processor. The state machine, upon the next clock pulse, will go from state E to state 6 and waits until the byte count equals zero, indicating that the ECC bytes have, in this case, been transferred. Upon the next clock pulse after the byte count equals zero signal has been generated, the state machine will again enter state 4 from state 6. The transfer done interrupt will be generated to the host processor. The block counter will be decremented and the sector available counter will be incremented since the long bit in the AT registers 25 has been reset by state E. The sector count will equal zero and the state machine will go from state 4 to state C. State C again enables the ECC transfer, resets IO16 and sets busy. Since long bit was reset, the state machine at the next clock pulse will go to state 8 rather than state E.

State 8

State 8 will reset the read mode, reset the ECC transfer, and reset DRQ. The next clock pulse will switch to state 0 because the READ command has been completed.

State 5

State 5 will be entered only upon a MULTIPLE READ command and the next clock pulse will switch the state machine to state 7.

State 7

State 7 will prepare the state machine to read the next sector by loading the byte counter, generate the clock compression bit signal to determine if compression is turned on for the next sector such that the proper data path is established by multiplexer 3 and initiating a cycle of the update task file state machine. The update task machine will decrement the sector counter and will generate the address for the next sector to be read. If the block count is not equal to zero then the next sector to be read is within the block and present in the buffer. Under this condition, the state machine will loop through states 5, 7, 6 and 4 until all sectors in the MULTIPLE READ command have been read. At this time, the state machine will switch to state C rather than state 5 and will proceed through states C and 8 into state 0 completing the MULTIPLE READ command. If the block count is equal to zero, the number of sectors to be read is greater than the number of sectors in the block. This condition will require the loading of the sectors in the next block to be loaded into the buffer before the next sector can be transferred to the host. Under this condition the state machine will be switched from state 7 to state F by the next clock pulse.

State F

State F ends the current block transfer by resetting DRQ, setting busy, loading the block count to the value of the number of sectors in the next block and loading the inter-sector delay counter from the AT registers. The next clock pulse switches the state machine to state D.

State D

The state machine will remain in state D until the end of the delay and then the next clock pulse will switch the state machine to state 9. The state machine will then cycle through states 9, B, A, 2, 6, 4, 5, 7, F and D until all sector in all blocks have been read for the MULTIPLE READ command. On the last pass through the cycle the state machine will switch from state 4 to state C rather than to state 5 and then will proceed through state 8 to state 0 completing the Multiple READ command.

WRITE STATE MACHINE

The Write State Machine controls the operation of all writes and allows the complete automation of write transfers. This allows the between sector overhead of a write transfer to be eliminated from the task to be performed by the microprocessor, thereby freeing the microprocessor to perform other tasks simultaneously as the write machine controls the write operation. Since all write operations are treated as multiple operations, a multiple transfer will be treated, until the segment is completed without host intervention, just like a normal write operation. This means that the WRITE MULTIPLE command can become an auto write command. The only distinction in the write state machine between a WRITE MULTIPLE command and other WRITE commands is that the block size for non-multiple WRITE command is always equal to one.

STRUCTURE

Figure 8:
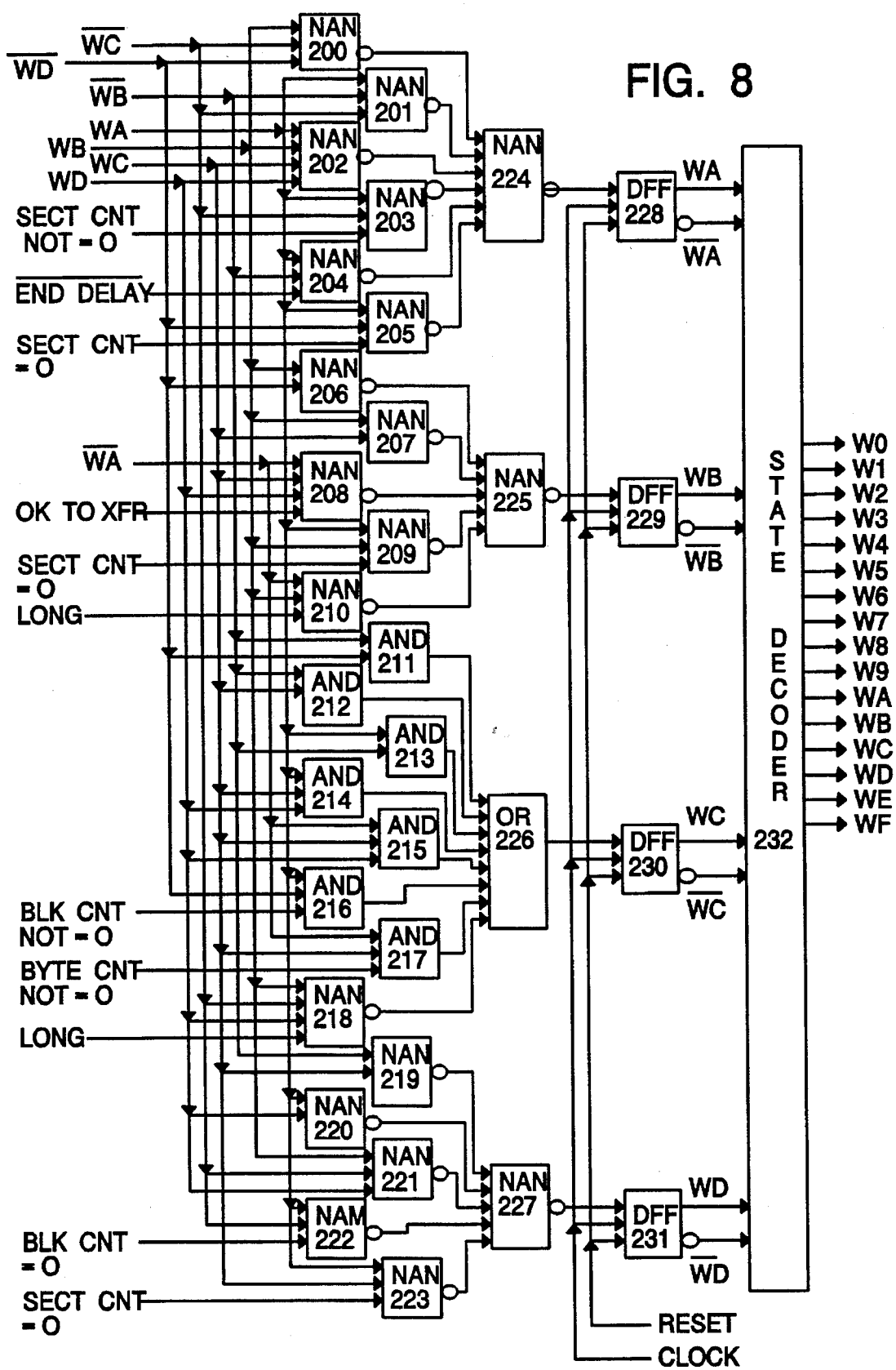
FIG. 8 is a logic diagram of the Write State Machine.

FIG. 8 is a logic diagram of the Write State Machine 7 and FIG. 10 is a logic diagram of the control circuitry controlled by the Write State Machine 7. FFs 228, 229, 230 and 231 form a four bit register storing the present state of the state machine where FF 231 is the low bit and FF 228 is the high bit. State decoder 232 decodes the count in FFs 228, 229, 230 and 231 and provided sixteen signals W0 to WF corresponding to the sixteen states 0 to F where the signals will be present when the state machine is in the corresponding state. NANs 200 through 210, 218 through 225 and 227, ANDs 211 through 217 and OR 226 controls the sequence the states of the state machine as a function of the present state stored in FFs 228, 229, 230 and 231 and control signals from the AT registers 25. NAN 224, NAN 225, OR 226 and NAN 227 outputs represent the state of the state machine that will be read into FFs 228, 229, 230 and 231 by the next clock pulse. NORs 700–703, 711–714, 716, 720, and 731, ORs 704, 706, 715, 725 and 730, ANDs 707, 709 and 719, INV 721 and NANs 726 and 727 of FIG. 10 generates the various control signal for the processing of the WRITE commands as a function of the state of state machine as provided by output signal W0 through WF and control signals from the AT register 25.

OPERATION

Figure 9:
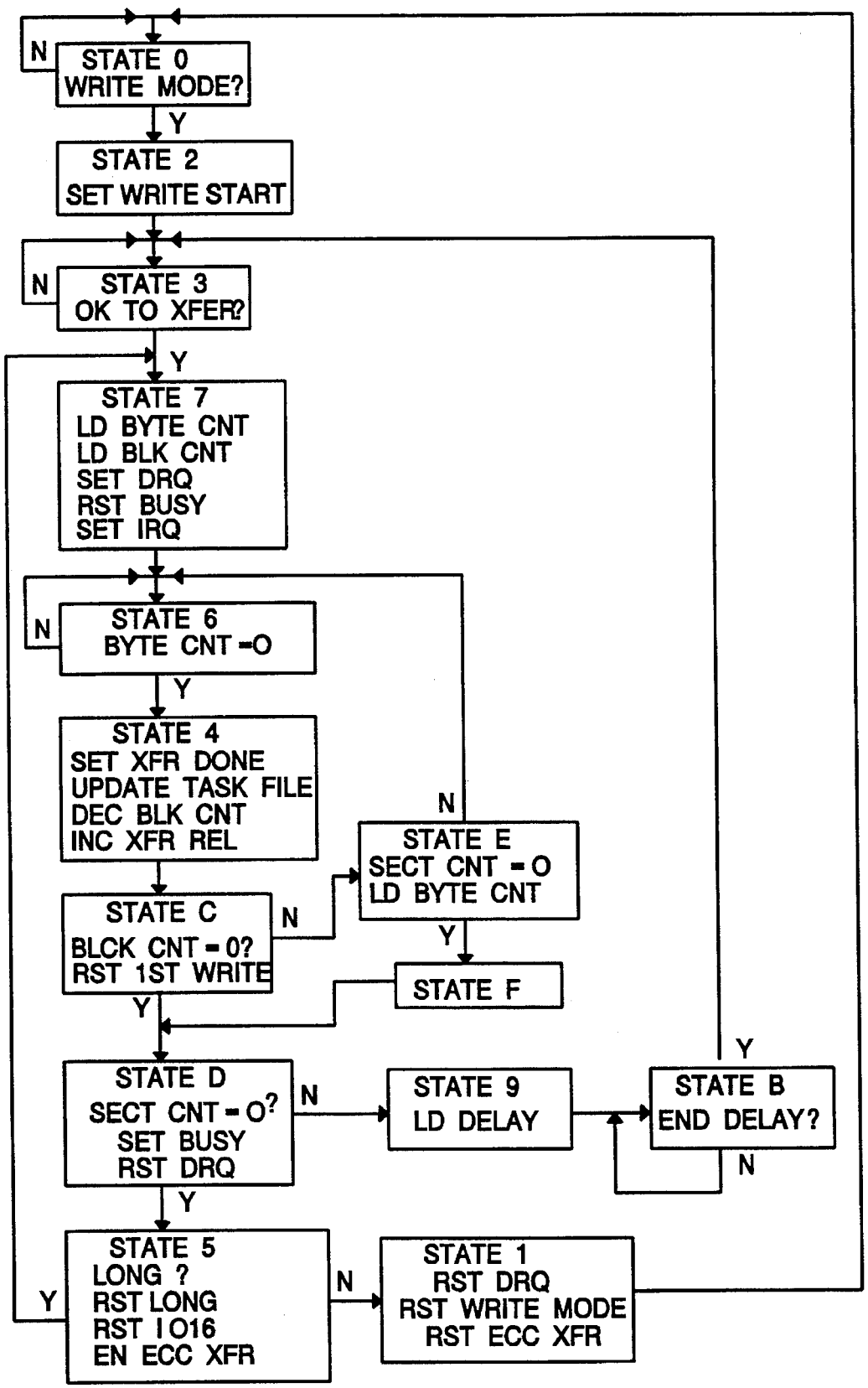
FIG. 9 is a flow chart of the operation of the Write State Machine.

The operation of the Write State Machine 7 will be described with reference to the flow chart of FIG. 9.

State 0

The Write State Machine 7 is in a sleep condition in this state until the write mode is set in the AT register 25 which causes the state machine to be switched to state 2.

State 2

The state machine in state 2 will generate a write start signal which will set the first write latch in the state machine, resets DRQ if set and blocks the first IRQ. The next clock pulse will switch the state machine to state 3.

State 3

The state machine will wait for an OK-to-transfer signal to be generated which is indicative that there is space available in buffer 11. The amount of space required in the buffer 11 is different if the command is a WRITE MULTIPLE command as opposed to any other WRITE command. For a WRITE MULTIPLE command, enough sectors are required to be free in buffer 11 as the number of sector in the block to be transferred. For any other WRITE command there only needs to be one sector available in buffer 11 for the transfer to proceed. For all WRITE commands the segment size in the AT registers 25 is used to determine the availability of buffer 11. Upon the occurrence of the OK-to-transfer signal, the next clock pulse will switch the state machine in state 7.

State 7

State 7 will load the byte counter, load the block counter, set DRQ, reset busy, and set IRQ. The setting of IRQ indicates to the host that the transfer is ready to take place. The state machine is then switches to state 6 by the next clock pulse.

State 6

The state machine will remain in state 6 until the byte counter equals zero under the control of the Byte Count State Machine 4. The setting of the byte count equal to zero indicates that a sector has been transferred from the host to buffer 11. Upon sensing that the byte count is equal to zero the state machine will be switched to state 4, by the next clock pulse.

State 4

State 4 will set the transfer done interrupt, will generate an update task file signal which in turn will cause the Update Task File State Machine 5 to decrement the sector counter and increment the sector address, will decrement the block counter, and will increment the transfer release which in a write operation will decrement the sector available register in the AT registers 25. Upon the next clock pulse the state machine will switch to state C.

State C

State C will reset the first write latch in the state machine. If the block counter is not equal to zero the state machine will be switched to state E indicating a MULTIPLE WRITE command and that there are sectors in the block to be transferred. Where the block counter is equal to zero, the state machine will be switched to state D indicating for a MULTIPLE WRITE command that all the sectors in the block have been written to buffer 11 or for all other WRITE commands that the sector has been written to buffer 11.

State E

State E will load the byte counter for the transferring of the next sector by the Byte Count State Machine 4. If the sector counter is equal to zero, the state machine will switch to state F indicating that there are no more sectors to be transferred for the block. If the sector count is not equal to zero, the state machine will switch to state 6. The state machine will cycle through states E, 6, 4 and C until all the sector to be written for that block have been transferred to buffer 11.

State F

The next clock pulse will switch the state machine to state D.

State D

State D, entered from either state C or state F, except for a WRITE LONG command, sets busy and resets DRQ ending the write operation for that block of a MULTIPLE WRITE command and for all other WRITE commands except for WRITE LONG command. If the sector count is equal to zero, the next clock pulse switches the state machine to state 5 indicating that all WRITE commands have been completed except for the WRITE LONG command. If the sector count is not equal to zero, the state machine will switched to state 9 indicating that the MULTIPLE WRITE command still has sector to be transferred.

State 9

State 9 will load the intersector delay counter which will set the intersector delay bit in the AT registers 25. The next clock pulse switches the state machine to state B.

State B

The state machine will stay in state B until an end the delay is indicated by resetting the intersector delay bit in the AT registers 25 which will cause the state machine to be switch to state 3 by the next clock pulse. The state machine will cycle through states 9, 8, 3, 7, 6, 4, C and D until all sectors have been transferred to buffer 11 for a MULTIPLE WRITE command.

State 5

If the long bit in the AT registers is set the command is a WRITE LONG command and the state machine is switched to state 7 by the next clock pulse. If the long bit is not set then the system will shift from state 5 to state 1. Before switching states, state 5 resets the long bit and IO16 in the AT registers and sets the enable ECC transfer. The state machine then goes through states 7, 6, 4, C, and D for transferring the ECC bytes from the host to buffer 11. Since the long bit has now been reset, state D will have reset busy and DRQ and state 5 will be switched to state 1 by the next clock pulse.

State 1

State 1 will reset DRQ, reset the write mode latch and will reset ECC transfer. The state machine then switches to state 0 by the next clock pulse indicating the completion of all WRITE commands.

The foregoing description of the invention has been described in conjunction with a flash solid state drive. It should be understood that the invention is not limited to this environment and is applicable to any disk drive system with an ATA interface.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. An interface apparatus, within a storage system, for controlling the transfer of sectors of data between a host processor and a buffer within the storage system in response to READ and WRITE command issued by the host processor, said apparatus comprising;

a Byte Count State Machine for controlling the transfer of a sector of data between said host processor and said buffer and for generating a signal indicating when last byte of data has been transferred for a sector;

an Update Task File State Machine having a machine cycle for decrementing by one the number of sectors still to be transferred after a sector has been transferred by said Byte Count State Machine and for causing a sector address to be generated for the next sector to be transferred by said Byte Count State Machine;

a Read State Machine for controlling the processing of all READ commands issued by said host processor to said storage system and processing said received READ command in response to said last byte signal generated by said Byte Count State Machine and the initiation of machine cycles in said Update Task File State Machine to maintain the count of the number of sectors still to be read and the generation of then next sectors address where a next sector is to be read; and a Write State Machine for controlling the processing of all WRITE commands issued by said host processor to said storage system and processing said received WRITE command in response to said last byte signal generated by said Byte Count State Machine and the initiation of machine cycles in said Update Task File State Machine to maintain the count of the number of sectors still to be written and the generation of then next sectors address where a next sector is to be written.

2. The apparatus of claim 1 further comprising;

a data register for temporarily storing data received from said host processor or to be transferred to said host processor;

a multiplexer for controlling the data path through said storage system between said buffer and said data register;

a buffer controller for controlling the transferring of data into and out of said buffer; and said Byte Count State Machine transfers one byte of data at a time between said data register and said buffer by issuing control signals to said multiplexer and said buffer controller.

3. The apparatus of claim 2 further comprising;

a plurality of AT registers for providing the status of said storage system during the processing of a READ or WRITE command where the contents of said AT registers may be modified and read by said host processor, said Byte Count State Machine, said Update task File State Machine, said Read State Machine and said Write State Machine thereby providing communication paths between said host processor, said Byte Count State Machine, said Update task File State Machine, said Read State Machine and said Write State Machine to facilitate the processing of READ and WRITE commands issued by said host processor.

4. The apparatus of claim 3 wherein;

said data register stores two bytes of data for receiving and sending data words to said host processor where a data word is comprised of two bytes of data, a high byte and a low byte; and said Byte Count State Machine further includes:

first means for controlling the separation of said two bytes of data stored in said data register into two sequential bytes of data to be stored in said buffer; and second means for controlling the combining of two sequential bytes from said buffer for storage in said data register to form a data word to be transferred to said host processor.

5. The apparatus of claim 3 wherein said Read State Machine comprises:

third means for generating a gate first word signal to said Byte Count State Machine to allow the first data word to be formed in said data register by said Byte Count State Machine prior to a first request for a data word being generated by said host processor during a READ command.

6. The apparatus of claim 5 wherein said AT registers comprise:

a block count register for storing the number of sectors to be transferred for the block; and said Read State Machine further comprises:

fourth means for setting said block count register to a value of 1 for all READ commands except a MULTIPLE READ command, said Read State Machine in response to a value of 1 in said block count register processing all READ commands in the same manner resulting in an increase in overall efficiency of said storage system in processing READ commands.

7. The apparatus of claim 6 wherein said Write State Machine further comprises fifth means for setting said block count register to a value of 1 for all WRITE commands except a MULTIPLE WRITE command, said Write State Machine in response to a value of 1 in said block count register processing all WRITE Commands in the same manner resulting in an increase in overall efficiency of said storage system in processing WRITE commands.

* * * * *